US010422233B2

(12) United States Patent

Spangler et al.

(10) Patent No.: US 10,422,233 B2
(45) Date of Patent: Sep. 24, 2019

(54) BAFFLE INSERT FOR A GAS TURBINE ENGINE COMPONENT AND COMPONENT WITH BAFFLE INSERT

(71) Applicant: United Technologies Corporation, Farmington, CT (US)

(72) Inventors: Brandon W. Spangler, Vernon, CT (US); Atul Kohli, Tolland, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 915 days.

(21) Appl. No.: 14/961,726

(22) Filed: Dec. 7, 2015

(65) Prior Publication Data

US 2017/0159456 A1 Jun. 8, 2017

(51) Int. Cl.
*F02C 1/00* (2006.01)
*F01D 5/18* (2006.01)
(Continued)

(52) U.S. Cl.
CPC ............. *F01D 5/189* (2013.01); *F01D 5/188* (2013.01); *F01D 9/02* (2013.01); *F01D 11/08* (2013.01);
(Continued)

(58) Field of Classification Search
CPC ............... F01D 5/189; F05D 2260/221; F05D 2260/2212; F05D 2260/2214; F05D 2260/22141; F23R 2900/03045
See application file for complete search history.

(56) References Cited

U.S. PATENT DOCUMENTS 2,894,719 A 7/1959 Foster
3,574,481 A * 4/1971 Pyne, Jr. ................ F01D 5/189 416/90 R
(Continued)

FOREIGN PATENT DOCUMENTS

EP 0392664 A2 10/1990
EP 1870561 A2 12/2007
(Continued)

OTHER PUBLICATIONS

European Search Report for Application No. EP 16 20 2732.
(Continued)

*Primary Examiner* — Gerald L Sung
(74) *Attorney, Agent, or Firm* — Cantor Colburn LLP

(57) ABSTRACT

A component of a gas turbine engine having: an internal cooling cavity; a baffle insert configured to be inserted into the internal cooling cavity; a plurality of trip strips extending upwardly from an exterior surface of the baffle insert; at least one separating feature located between a pair of ends of a pair of the plurality of trip strips, wherein the plurality of trip strips and the at least one separating feature are spaced from an interior surface of the internal cooling cavity; a plurality of trip strips extending upwardly from the interior surface; and at least one separating feature located between a pair of ends of the plurality of trip strips located on the interior surface of the internal cooling cavity, wherein the plurality of trip strips and the at least one separating feature of the interior surface are spaced from the exterior surface of the baffle insert.

20 Claims, 23 Drawing Sheets

(51) Int. Cl.

| | |
|---|---|
| ***F01D 9/02*** | (2006.01) |
| ***F01D 11/08*** | (2006.01) |
| ***F01D 25/12*** | (2006.01) |
| ***F23R 3/00*** | (2006.01) |

(52) U.S. Cl.

CPC .............. *F01D 25/12* (2013.01); *F23R 3/002* (2013.01); *F05D 2220/32* (2013.01); *F05D 2240/126* (2013.01); *F05D 2240/127* (2013.01); *F05D 2240/35* (2013.01); *F05D 2260/204* (2013.01); *F05D 2260/2212* (2013.01); *F05D 2260/22141* (2013.01)

(56) References Cited

U.S. PATENT DOCUMENTS

| | | | | |
|---|---|---|---|---|
| 3,635,587 | A | 1/1972 | Giesman et al. | |
| 3,806,276 | A | 4/1974 | Aspinwall | |
| 4,021,139 | A | 5/1977 | Franklin | |
| 4,118,146 | A | 10/1978 | Dierberger | |
| 4,991,390 | A | 2/1991 | Shah | |
| 5,120,192 | A | 6/1992 | Ohtomo et al. | |
| 5,253,976 | A | 10/1993 | Cunha | |
| 5,395,212 | A * | 3/1995 | Anzai | F01D 5/187 415/115 |
| 5,976,337 | A | 11/1999 | Korinko et al. | |
| 6,142,734 | A * | 11/2000 | Lee | F01D 5/189 249/117 |
| 6,238,182 | B1 * | 5/2001 | Mayer | F01D 5/189 415/115 |
| 6,554,563 | B2 | 4/2003 | Noe et al. | |
| 7,201,564 | B2 | 4/2007 | Bolms et al. | |
| 7,824,150 | B1 | 11/2010 | Kimmel et al. | |
| 8,419,365 | B2 | 4/2013 | Kizuka et al. | |
| 10,006,295 | B2 | 6/2018 | Spangeler et al. | |
| 2003/0049127 | A1 * | 3/2003 | Tiemann | F01D 5/189 416/97 R |
| 2004/0022630 | A1 | 2/2004 | Tiemann | |
| 2007/0014663 | A1 | 1/2007 | Dellmann et al. | |
| 2009/0047136 | A1 | 2/2009 | Chon et al. | |
| 2010/0247284 | A1 | 9/2010 | Gregg et al. | |
| 2012/0163994 | A1 | 6/2012 | Kwon | |
| 2013/0243591 | A1 | 9/2013 | Propheter-Hinckley et al. | |
| 2014/0056717 | A1 | 2/2014 | Nadeau et al. | |
| 2014/0338866 | A1 | 11/2014 | Lee | |
| 2015/0285082 | A1 * | 10/2015 | Szijarto | F01D 5/187 416/95 |
| 2016/0102563 | A1 | 4/2016 | Spangeler et al. | |
| 2016/0222793 | A1 | 8/2016 | Snyder | |
| 2017/0030202 | A1 | 2/2017 | Itzel et al. | |
| 2017/0159454 | A1 | 6/2017 | Spangler | |
| 2017/0159455 | A1 | 6/2017 | Spangler | |
| 2017/0159567 | A1 | 6/2017 | Spangler et al. | |
| 2017/0204734 | A1 * | 7/2017 | Groves, II | F01D 9/065 |

FOREIGN PATENT DOCUMENTS

| | | | |
|---|---|---|---|
| EP | 1873354 | A2 | 1/2008 |
| EP | 2159376 | A2 | 3/2010 |
| EP | 2236751 | A2 | 10/2010 |
| EP | 2472062 | A1 | 7/2012 |
| EP | 2927428 | A1 | 10/2015 |
| WO | 2015023338 | A2 | 2/2015 |
| WO | 2015123017 | A1 | 8/2015 |

OTHER PUBLICATIONS

European Search Report for Application No. EP 16 20 2734.
European Search Report for Application No. EP 16 20 2770.
European Search Report for Application No. EP 16 20 2771.

* cited by examiner

BAFFLE INSERT FOR A GAS TURBINE ENGINE COMPONENT AND COMPONENT WITH BAFFLE INSERT

BACKGROUND

This disclosure relates generally to gas turbine engines and, more particularly, to cooling techniques for the airfoil sections of turbine blades and/or vanes of the engine. In particular, the present application is directed to an insert for use in convective cooling of the airfoils of the gas turbine engine which are exposed to high-temperature working fluid flow.

In general, gas turbine engines are built around a power core comprising a compressor, a combustor and a turbine, which are arranged in flow series with a forward (upstream) inlet and an aft (downstream) exhaust. The compressor compresses air from the inlet, which is mixed with fuel in the combustor and ignited to produce hot combustion gases. The hot combustion gases drive the turbine section, and are exhausted with the downstream flow.

The turbine drives the compressor via a shaft or a series of coaxially nested shaft spools, each driven at different pressures and speeds. The spools employ a number of stages comprised of alternating rotor blades and stator vanes. The vanes and blades typically have airfoil cross sections, in order to facilitate compression of the incoming air and extraction of rotational energy in the turbine.

High combustion temperatures also increase thermal and mechanical loads, particularly on turbine airfoils downstream of the combustor. This reduces service life and reliability, and increases operational costs associated with maintenance and repairs.

Accordingly, it is desirable to provide cooling to the airfoils of the engine.

BRIEF DESCRIPTION

In one embodiment, a baffle insert for a component of a gas turbine engine is provided. The baffle insert having: a plurality of trip strips extending upwardly from an exterior surface of the baffle insert; and at least one rib extending upwardly from the exterior surface of the baffle insert.

In addition to one or more features described above, or as an alternative to any of the foregoing embodiments, the exterior surface of the baffle insert may be elliptical in shape.

In addition to one or more features described above, or as an alternative to any of the foregoing embodiments, the at least one rib may be vertically arranged with respect to a length of the baffle insert.

In addition to one or more features described above, or as an alternative to any of the foregoing embodiments, the at least one rib may be a plurality of ribs.

In addition to one or more features described above, or as an alternative to any of the foregoing embodiments, the at least one rib may be arranged in a spiral with respect to a length of the baffle insert.

In addition to one or more features described above, or as an alternative to any of the foregoing embodiments, the plurality of ribs may have varying lengths.

In addition to one or more features described above, or as an alternative to any of the foregoing embodiments, the plurality of trip strips may be arranged around the entire perimeter of the baffle insert.

In addition to one or more features described above, or as an alternative to any of the foregoing embodiments, the plurality of trip strips may have varying lengths.

In addition to one or more features described above, or as an alternative to any of the foregoing embodiments, the at least one rib may be a plurality of ribs and wherein the exterior surface of the baffle insert may be elliptical in shape.

In addition to one or more features described above, or as an alternative to any of the foregoing embodiments, the plurality of trip strips may be arranged in at least one of the following configurations: a corkscrew configuration; an offset corkscrew configuration; a chevron configuration; an offset chevron configuration; a spiral corkscrew configuration; an offset spiral corkscrew configuration; a multi-length corkscrew configuration; and a crosshatch configuration.

In another embodiment, a baffle insert for a component of a gas turbine engine is provided. The baffle insert having: a plurality of trip strips extending upwardly from an exterior surface of the baffle insert; and at least one gap located between a pair of ends of a pair of the plurality of trip strips, wherein the exterior surface of the baffle insert is elliptical in shape.

In addition to one or more features described above, or as an alternative to any of the foregoing embodiments, the at least one gap may be a plurality of gaps.

In addition to one or more features described above, or as an alternative to any of the foregoing embodiments, the at least one gap may be vertically arranged with respect to the length of the baffle insert.

In addition to one or more features described above, or as an alternative to any of the foregoing embodiments, the plurality of trip strips may have varying lengths.

In addition to one or more features described above, or as an alternative to any of the foregoing embodiments, the plurality of trip strips may be arranged in at least one of the following configurations: a corkscrew configuration; an offset corkscrew configuration; a chevron configuration; an offset chevron configuration; a spiral corkscrew configuration; an offset spiral corkscrew configuration; a multi-length corkscrew configuration; and a crosshatch configuration.

In addition to one or more features described above, or as an alternative to any of the foregoing embodiments, the at least one gap may be arranged in a spiral with respect to a length of the baffle insert.

In addition to one or more features described above, or as an alternative to any of the foregoing embodiments, the plurality of trip strips may be are arranged around the entire perimeter of the baffle insert.

In addition to one or more features described above, or as an alternative to any of the foregoing embodiments, the at least one gap may be a plurality of gaps each being located between a pair of ends of a pair of the plurality of trip strips, wherein each pair of ends of the plurality of trip strips are radially offset from each other.

In addition to one or more features described above, or as an alternative to any of the foregoing embodiments, the at least one gap may be vertically arranged with respect to a length of the baffle insert.

In addition to one or more features described above, or as an alternative to any of the foregoing embodiments, the plurality of trip strips may be arranged in a corkscrew configuration with respect to the length of the baffle insert.

In yet another embodiment, a component of a gas turbine engine is provided. The component having: an internal cooling cavity extending through an interior of the component; a baffle insert configured to be inserted into the internal cooling cavity; a plurality of trip strips extending upwardly from an exterior surface of the baffle insert; and at least one rib extending upwardly from the exterior surface of the baffle insert, wherein the plurality of trip strips and the at least one rib are spaced from an interior surface of the internal cooling cavity.

In addition to one or more features described above, or as an alternative to any of the foregoing embodiments, the interior surface of the internal cooling cavity may be elliptical in shape.

In addition to one or more features described above, or as an alternative to any of the foregoing embodiments, the exterior surface of the baffle insert may be elliptical in shape.

In addition to one or more features described above, or as an alternative to any of the foregoing embodiments, the interior surface of the internal cooling cavity may be elliptical in shape.

In addition to one or more features described above, or as an alternative to any of the foregoing embodiments, the at least one rib may be a plurality of ribs.

In addition to one or more features described above, or as an alternative to any of the foregoing embodiments, the at least one rib may be arranged in at least one of the following configurations: vertically arranged with respect to a length of the baffle insert; and spirally arranged with respect to a length of the baffle insert.

In addition to one or more features described above, or as an alternative to any of the foregoing embodiments, the plurality of ribs may have varying lengths.

In addition to one or more features described above, or as an alternative to any of the foregoing embodiments, the plurality of trip strips may be arranged around the entire perimeter of the baffle insert.

In addition to one or more features described above, or as an alternative to any of the foregoing embodiments, the plurality of trip strips may have varying lengths.

In addition to one or more features described above, or as an alternative to any of the foregoing embodiments, the plurality of trip strips may be arranged in at least one of the following configurations: a corkscrew configuration; an offset corkscrew configuration; a chevron configuration; an offset chevron configuration; a spiral corkscrew configuration; an offset spiral corkscrew configuration; a multi-length corkscrew configuration; and a crosshatch configuration.

In addition to one or more features described above, or as an alternative to any of the foregoing embodiments, the component may be one of: a vane; a blade; a blade outer air seal; and combustor panel.

In addition to one or more features described above, or as an alternative to any of the foregoing embodiments, the component may be an airfoil.

In addition to one or more features described above, or as an alternative to any of the foregoing embodiments, the plurality of trip strips may be arranged in at least one of the following configurations: a corkscrew configuration; an offset corkscrew configuration; a chevron configuration; an offset chevron configuration; a spiral corkscrew configuration; an offset spiral corkscrew configuration; a multi-length corkscrew configuration; and a crosshatch configuration.

In yet another embodiment, a component of a gas turbine engine is provided. The component having: an internal cooling cavity extending through an interior of the component; a baffle insert configured to be inserted into the internal cooling cavity; a plurality of trip strips extending upwardly from an exterior surface of the baffle insert; and at least one gap located between a pair of ends of a pair of the plurality of trip strips, wherein the internal cooling cavity is elliptical in shape.

In addition to one or more features described above, or as an alternative to any of the foregoing embodiments, the exterior surface of the baffle insert may be elliptical in shape.

In addition to one or more features described above, or as an alternative to any of the foregoing embodiments, the at least one gap may be a plurality of gaps and wherein the plurality of gaps are arranged around the entire perimeter of the baffle insert.

In addition to one or more features described above, or as an alternative to any of the foregoing embodiments, the at least one gap may be arranged in at least one of the following configurations: vertically arranged with respect to a length of the baffle insert; and spirally arranged with respect to a length of the baffle insert.

In addition to one or more features described above, or as an alternative to any of the foregoing embodiments, the plurality of gaps may have varying lengths.

In addition to one or more features described above, or as an alternative to any of the foregoing embodiments, the plurality of trip strips may have varying lengths.

In addition to one or more features described above, or as an alternative to any of the foregoing embodiments, the plurality of trip strips may be arranged in at least one of the following configurations: a corkscrew configuration; an offset corkscrew configuration; a chevron configuration; an offset chevron configuration; a spiral corkscrew configuration; an offset spiral corkscrew configuration; a multi-length corkscrew configuration; and a crosshatch configuration.

In yet another embodiment, a component of a gas turbine engine is provided. The component having: an internal cooling cavity extending through an interior of the component; a baffle insert configured to be inserted into the internal cooling cavity; a plurality of trip strips extending upwardly from an exterior surface of the baffle insert; at least one separating feature located between a pair of ends of a pair of the plurality of trip strips located on the exterior surface of the baffle insert, wherein the plurality of trip strips and the at least one separating feature of the baffle insert are spaced from an interior surface of the internal cooling cavity; a plurality of trip strips extending upwardly from the interior surface of the internal cooling cavity; and at least one separating feature located between a pair of ends of the plurality of trip strips located on the interior surface of the internal cooling cavity, wherein the plurality of trip strips and the at least one separating feature of the interior surface of the cooling cavity are spaced from the exterior surface of the baffle insert.

In addition to one or more features described above, or as an alternative to any of the foregoing embodiments, the plurality of trip strips of the baffle insert and the interior surface of the internal cooling cavity may be arranged in at least one of the following configurations: a corkscrew configuration; an offset corkscrew configuration; a chevron configuration; an offset chevron configuration; a spiral corkscrew configuration; an offset spiral corkscrew configuration; a multi-length corkscrew configuration; and a crosshatch configuration.

In addition to one or more features described above, or as an alternative to any of the foregoing embodiments, the plurality of trip strips of the baffle insert may be arranged in a co-flowing configuration with respect to the plurality of trip strips of the interior surface of the internal cooling cavity.

In addition to one or more features described above, or as an alternative to any of the foregoing embodiments, the plurality of trip strips of the baffle insert may be arranged in a counter-flowing configuration with respect to the plurality of trip strips of the interior surface of the internal cooling cavity.

In addition to one or more features described above, or as an alternative to any of the foregoing embodiments, the at least one separating feature may be a rib located on at least one of the baffle insert and the interior surface of the internal cooling cavity.

In addition to one or more features described above, or as an alternative to any of the foregoing embodiments, the rib may be a plurality of ribs.

In addition to one or more features described above, or as an alternative to any of the foregoing embodiments, the rib may be orientated in one of the following configurations: vertically arranged with respect to a length of the baffle insert; and spirally arranged with respect to a length of the baffle insert.

In addition to one or more features described above, or as an alternative to any of the foregoing embodiments, the internal cooling cavity may be elliptical in shape.

In addition to one or more features described above, or as an alternative to any of the foregoing embodiments, the exterior surface of the baffle insert may be elliptical in shape.

In addition to one or more features described above, or as an alternative to any of the foregoing embodiments, the at least one separating feature may be a plurality of separating features.

In addition to one or more features described above, or as an alternative to any of the foregoing embodiments, the plurality of trip strips of the baffle insert may be arranged in a co-flowing configuration with respect to the plurality of trip strips of the interior surface of the internal cooling cavity.

In addition to one or more features described above, or as an alternative to any of the foregoing embodiments, the plurality of trip strips of the baffle insert may be arranged in a counter-flowing configuration with respect to the plurality of trip strips of the interior surface of the internal cooling cavity.

In addition to one or more features described above, or as an alternative to any of the foregoing embodiments, the at least one separating feature may be a rib.

In addition to one or more features described above, or as an alternative to any of the foregoing embodiments, the rib may be a plurality of ribs and the plurality of ribs may have varying lengths.

In addition to one or more features described above, or as an alternative to any of the foregoing embodiments, the at least one separating feature may be a plurality of gaps and the plurality of gaps are arranged in at least one of the following configurations: vertically arranged with respect to the length of the baffle insert; and spirally arranged with respect to the length of the baffle insert.

In addition to one or more features described above, or as an alternative to any of the foregoing embodiments, the at least one separating feature may be a plurality of gaps and the plurality of gaps are arranged in at least one of the following configurations: vertically arranged with respect to the length of the baffle insert; and spirally arranged with respect to the length of the baffle insert.

In addition to one or more features described above, or as an alternative to any of the foregoing embodiments, the exterior surface of the baffle insert may be elliptical in shape and wherein the at least one separating feature is a plurality of gaps and the plurality of gaps are arranged in at least one of the following configurations: vertically arranged with respect to the length of the baffle insert; and spirally arranged with respect to the length of the baffle insert.

In addition to one or more features described above, or as an alternative to any of the foregoing embodiments, the plurality of trip strips may have varying lengths on at least one of the baffle insert and the interior surface of the internal cooling cavity.

In addition to one or more features described above, or as an alternative to any of the foregoing embodiments, the plurality of trip strips may be arranged around the entire perimeter of at least one of the baffle insert and the interior surface of the internal cooling cavity.

In addition to one or more features described above, or as an alternative to any of the foregoing embodiments, the component may be one of: a vane; a blade; a blade outer air seal; and a combustor panel.

In yet another embodiment, a method of increasing a heat transfer of a cooling fluid passing through a component of a gas turbine engine is provided. The method including the steps of: directing a cooling fluid between an interior surface of an internal cooling cavity of the component and an exterior surface of a baffle insert located in the internal cooling cavity; and creating a plurality of vortices in the cooling fluid as it passes between the exterior surface of the baffle insert and the interior surface of the internal cooling cavity, wherein the internal cooling cavity is elliptical in shape.

In addition to one or more features described above, or as an alternative to any of the foregoing embodiments, the plurality of vortices may be created by a plurality of trip strips extending upwardly from at least one of the exterior surface of the baffle insert and the interior surface of the internal cooling cavity; and wherein at least one of the exterior surface of the baffle insert and the interior surface of the internal cooling cavity may have at least one separating feature located between a pair of ends of a pair of the plurality of trip strips.

In addition to one or more features described above, or as an alternative to any of the foregoing embodiments, the at least one separating feature may be at least one of a rib and a gap.

In addition to one or more features described above, or as an alternative to any of the foregoing embodiments, the plurality of trip strips may be arranged around the entire perimeter of at least one of the exterior surface of the baffle insert and the interior surface of the internal cooling cavity.

In addition to one or more features described above, or as an alternative to any of the foregoing embodiments, the plurality of trip strips on at least one of the baffle insert and the interior surface of the internal cooling cavity may be arranged in at least one of the following configurations: a corkscrew configuration; an offset corkscrew configuration; a chevron configuration; an offset chevron configuration; a spiral corkscrew configuration; an offset spiral corkscrew configuration; a multi-length corkscrew configuration; and a crosshatch configuration.

In addition to one or more features described above, or as an alternative to any of the foregoing embodiments, the plurality of trip strips and at least one separating feature may be located on the exterior surface of the baffle insert; and wherein a plurality of trip strips and at least one separating feature may be located on the interior surface of the internal cooling cavity. Still further and in yet another embodiment, a swirling flow is generated in the cooling fluid passing between the interior surface of the cavity and the exterior surface of the baffle insert. This swirling flow may create a swirling flow field that provides increased heat transfer as compared to the purely radial flow about the baffle insert. It being understood that the features on the baffle insert and/or the interior surface of the cavity will create the aforementioned flow in the cooling fluid passing between the interior surface of the cavity and the exterior surface of the baffle insert.

In addition to one or more features described above, or as an alternative to any of the foregoing embodiments, the plurality of trip strips of the baffle insert may be arranged in a co-flowing configuration with respect to the plurality of trip strips of the interior surface of the internal cooling cavity.

In addition to one or more features described above, or as an alternative to any of the foregoing embodiments, the plurality of trip strips of the baffle insert may be arranged in a counter-flowing configuration with respect to the plurality of trip strips of the interior surface of the internal cooling cavity.

In addition to one or more features described above, or as an alternative to any of the foregoing embodiments, the component may be one of a vane, a blade, a blade outer air seal, and a combustor panel.

In yet another embodiment, a method of increasing a heat transfer of a cooling fluid passing through a component of a gas turbine engine is provided. The method including the steps of: directing a cooling fluid between an interior surface of an internal cooling cavity of the component and an exterior surface of a baffle insert located in the internal cooling cavity, wherein the exterior surface of the baffle insert is elliptical in shape; and creating a plurality of vortices in the cooling fluid as it passes between the exterior surface of the baffle insert and the interior surface of the internal cooling cavity.

In addition to one or more features described above, or as an alternative to any of the foregoing embodiments, the internal cooling cavity may be elliptical in shape.

In addition to one or more features described above, or as an alternative to any of the foregoing embodiments, the vortices may be created by a plurality of trip strips extending upwardly from at least one of the exterior surface of the baffle insert and the interior surface of the internal cooling cavity; and wherein at least one of the exterior surface of the baffle insert and the interior surface of the internal cooling cavity may contain at least one separating feature located between a pair of ends of a pair of the plurality of trip strips.

In addition to one or more features described above, or as an alternative to any of the foregoing embodiments, the at least one separating feature may be at least one of a rib and a gap.

In addition to one or more features described above, or as an alternative to any of the foregoing embodiments, the plurality of trip strips may be arranged around the entire perimeter of at least one of the baffle insert and the interior surface of the internal cooling cavity.

In addition to one or more features described above, or as an alternative to any of the foregoing embodiments, the plurality of trip strips on at least one of the baffle insert and the interior surface of the internal cooling cavity may be arranged in at least one of the following configurations: a corkscrew configuration; an offset corkscrew configuration; a chevron configuration; an offset chevron configuration; a spiral corkscrew configuration; an offset spiral corkscrew configuration; a multi-length corkscrew configuration; and a crosshatch configuration.

In addition to one or more features described above, or as an alternative to any of the foregoing embodiments, a portion of the plurality of trip strips and at least one separating feature may be located on the exterior surface of the baffle insert; and wherein the portion of the plurality of trip strips and at least one separating feature may be located on the interior surface of the internal cooling cavity. Still further and in yet another embodiment, a swirling flow is generated in the cooling fluid passing between the interior surface of the cavity and the exterior surface of the baffle insert. This swirling flow may create a swirling flow field that provides increased heat transfer as compared to the purely radial flow about the baffle insert. It being understood that the features on the baffle insert and/or the interior surface of the cavity will create the aforementioned flow in the cooling fluid passing between the interior surface of the cavity and the exterior surface of the baffle insert.

In addition to one or more features described above, or as an alternative to any of the foregoing embodiments, the portion of the plurality of trip strips of the baffle insert may be arranged in a co-flowing configuration with respect to the portion of the plurality of trip strips of the interior surface of the internal cooling cavity.

In addition to one or more features described above, or as an alternative to any of the foregoing embodiments, the portion of the plurality of trip strips of the baffle insert may be arranged in a counter-flowing configuration with respect to the portion of the plurality of trip strips of the interior surface of the internal cooling cavity.

In addition to one or more features described above, or as an alternative to any of the foregoing embodiments, the component may be one of a vane, a blade, a blade outer air seal, and a combustor panel.

In addition to one or more features described above, or as an alternative to any of the foregoing embodiments, internal cooling cavity may be a plurality of internal cooling cavities and the baffle insert may be a plurality of baffle inserts.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

FIGS. 5A-12A and 13A illustrate various baffle insert configurations according to various embodiments of the present disclosure;

DETAILED DESCRIPTION

Various embodiments of the present disclosure are related to cooling techniques for airfoil sections of gas turbine components such as vanes or blades of the engine. In particular, the present application is directed to an insert or baffle or baffle insert used in conjunction with cooling passages of the airfoil.

Figure 1:
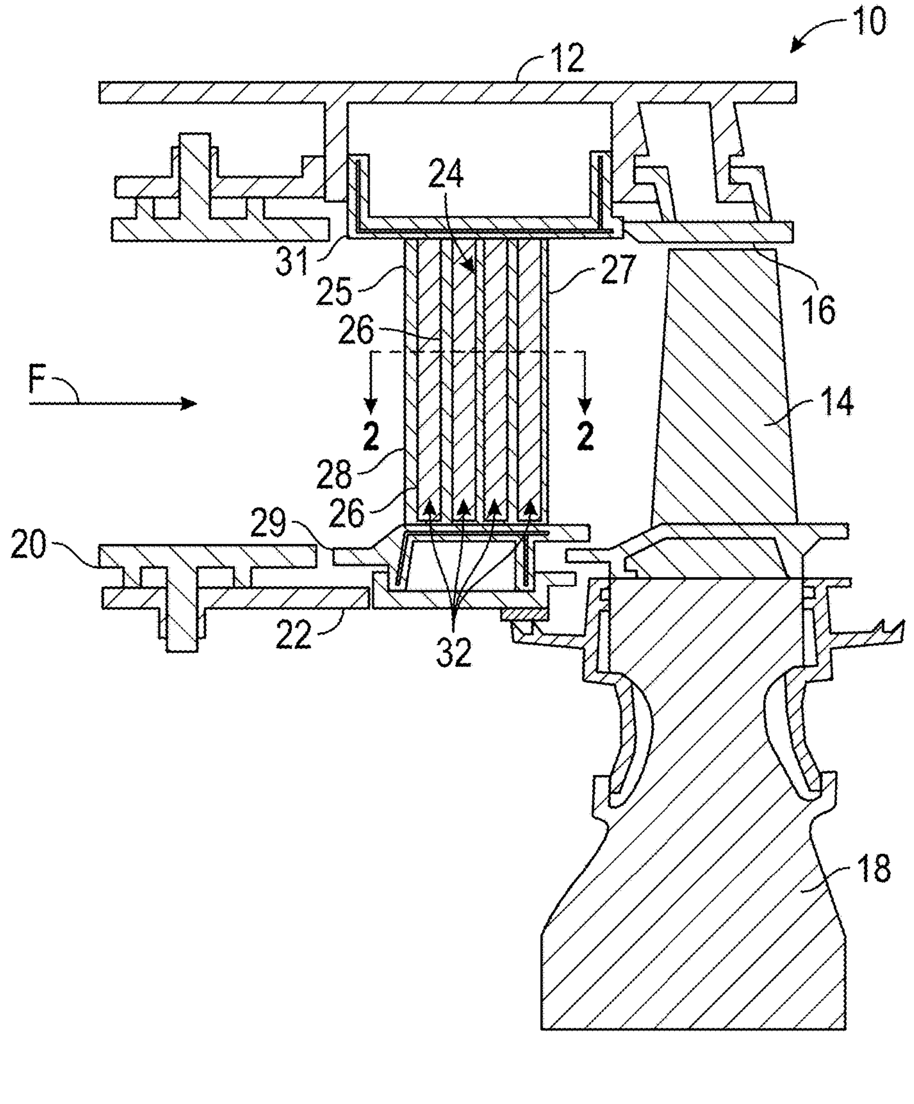
FIG. 1 is a cross-sectional view of a portion of a gas turbine engine.

FIG. 1 is a cross-sectional view of a portion of a gas turbine engine 10 wherein various components of the engine 10 are illustrated. These components include but are not limited to an engine case 12, a rotor blade 14, a blade outer air seal (BOAS) 16, a rotor disk 18, a combustor panel 20, a combustor liner 22 and a vane 24. As mentioned above, vane or component 24 is subjected to high thermal loads due to it being located downstream of a combustor of the engine 10. Thus, it is desirable to provide cooling to the airfoils of the engine.

In order to provide cooling air to the vane 24, a plurality of cooling openings or cavities 26 are formed within an airfoil 28 of the vane 24. The cooling openings or cavities 26 are in fluid communication with a source of cooling air so that thermal loads upon the vane can be reduced. In one non-limiting example, the cooling air is provided from a compressor section of the gas turbine engine.

Figure 2A:
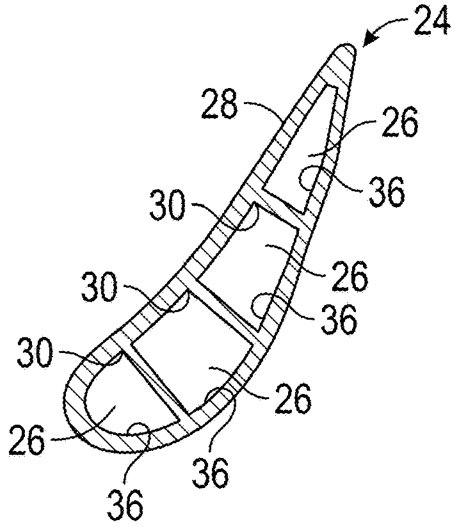
FIG. 2A is a cross-sectional view along lines 2-2 of FIG. 1.
Figure 2B:
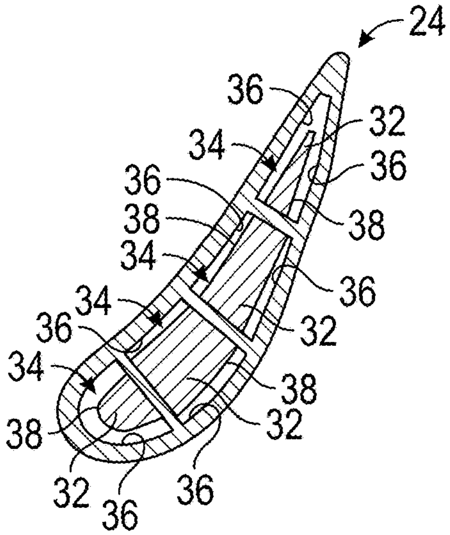
FIG. 2B is a cross-sectional view along lines 2-2 of FIG. 1.

The airfoil 28 extends axially between a leading edge 25 and a trailing edge 27 and radially between platforms 29 and 31. The internal cooling passages 26 are defined along internal surfaces 36 of the airfoil section 28, as seen in FIGS. 2A, 2B.

In the illustrated embodiment of FIG. 1, airfoil 28 is a stationary turbine vane for use in a turbojet or turbofan engine. In this embodiment, airfoil 28 is typically attached to a turbine case or flow duct at platform 29 and platform 31, using mechanical coupling structures such as hooks or by forming platforms 29, 31 as part of a case or shroud assembly.

In other embodiments, airfoil 28 may be configured for use in an industrial gas turbine engine, and platforms 29, 31 are modified accordingly. Alternatively, airfoil 28 may be formed as a rotating blade, for example blade 14 illustrated in FIG. 1. In these embodiments, airfoil or airfoil section 28 is typically formed into a tip at platform 31, and inner platform 29 accommodates a root structure or other means of attachment to a rotating shaft. In further embodiments, airfoil 28 is provided with additional structures for improved working fluid flow control, including, but not limited to, platform seals, knife edge seals, tip caps and squealer tips.

Airfoil 28 is exposed to a generally axial flow of combustion gas F, which flows across airfoil section 28 from leading edge 25 to trailing edge 27. Flow F has a radially inner flow margin at inner platform 29 and a radially outer flow margin at outer platform 31, or, in blade embodiments, at the blade tip.

To protect airfoil 28 from wear and tear due to the working fluid flow, its various components may be manufactured from durable, heat-resistant materials such as high-temperature alloys and superalloys. Surfaces that are directly exposed to hot gas may also be coated with a protective coating such as a ceramic thermal barrier coating (TBC), an aluminide coating, a metal oxide coating, a metal alloy coating, a superalloy coating, or a combination thereof.

Airfoil 28 is manufactured with internal cooling passages 26. The cooling passages are defined along internal surfaces forming channels or conduits for cooling fluid flow through airfoil section 28. In turbofan embodiments, the cooling fluid is usually provided from a compressed air source such as compressor bleed air. In ground-based industrial gas turbine embodiments, other fluids may also be used.

In FIG. 2A, the cooling openings or cavities 26 of one design are illustrated. However, a large opening as illustrated in FIG. 2A may result in lower Mach numbers of the air travelling therethough and thus lower overall heat transfer due to the flow of cooling air through the cavities. In various embodiments disclosed herein, convective flow may be described in terms of Mach number. Also, openings or cavities 26 with sharp corners 30 may result in localized areas of high stress, which may be undesirable due to the heat resistant materials used to manufacture airfoil 28.

In one implementation, baffle inserts 32 are inserted into openings or cavities 26 in order to create smaller air passages 34 between an inner wall or surface 36 of the airfoil and an exterior surface 38 of the baffle insert 32. This will increase the Mach numbers of the air flowing in the smaller air passages 34 and will increase the heat transfer achieved by the cooling air passing through passages 34. In various embodiments disclosed herein the baffle insert 32 will produce or create Mach acceleration in the convective flow, increasing the heat transfer coefficient by generating greater turbulence and other flow interactions in the region between the exterior surface 38 of the baffle insert 32 and the internal airfoil surface 36 of cavities or openings 26. For example, augmentors such as trip strips 40 and ribs 42, as seen in FIGS. 5A-13B, may be formed on the exterior surface 38 of the baffle insert 32 in order to increase turbulence and improve internal cooling.

By increasing the heat transfer coefficient of the cooling air passing through passages 34, this enhances convective cooling within the airfoil and lowers operating temperatures, increasing service life of the airfoil. Baffle insert 32 also reduces the cooling flow required to achieve these benefits, improving cooling efficiency and reserving capacity for additional downstream cooling loads.

Figure 3:
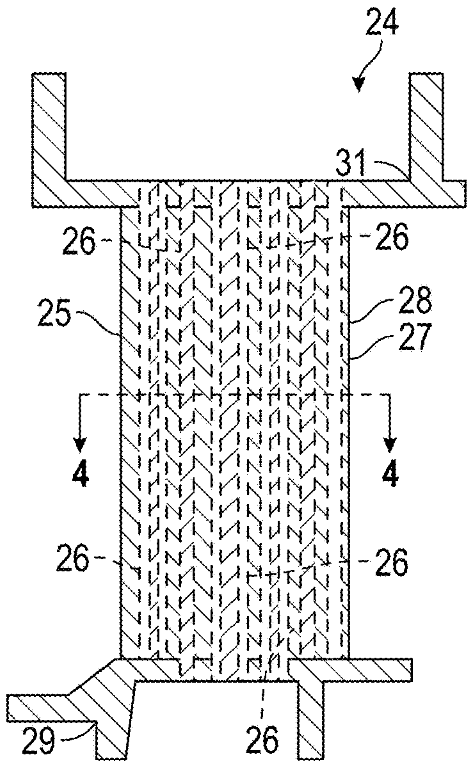
FIG. 3 is a cross-sectional view of vane of a gas turbine engine.
Figure 4:
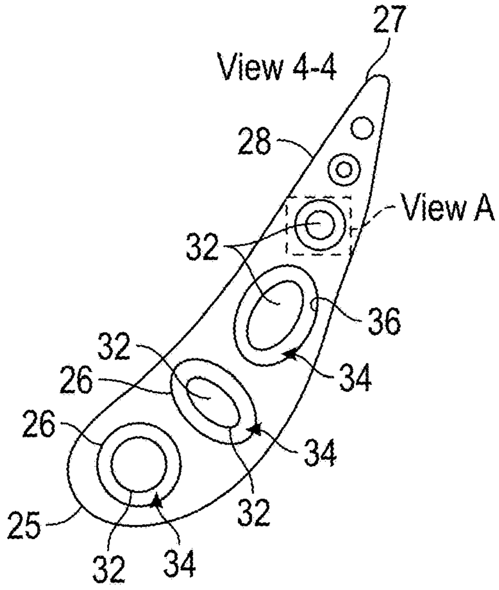
FIG. 4 is a cross-sectional view along lines 4-4 of FIG. 3.

Referring now to FIGS. 3 and 4, an embodiment of the present disclosure is illustrated. Here, the airfoil 28 of vane 24 is configured to have a plurality of elliptical cooling openings or cavities 26, which eliminates or reduces the areas of localized stress by removing the corners. In addition, a corresponding elliptical baffle insert 32 is located in the cooling openings or cavities 26 in order to create smaller air passages 34 between an inner wall or interior surface 36 of the openings or cavities 26 of the airfoil 28 and an exterior surface 38 of the baffle insert 32. This will increase the Mach numbers of the air flowing in the smaller air passages 34 and will increase the heat transfer achieved by the cooling air passing through passages 34. In this embodiment, the smaller air passages 34 may completely surround the elliptical baffle insert 32. In FIG. 4, the configurations of the elliptical openings or cavities 26 and their corresponding baffle inserts 32 may vary in size and/or configuration due to their location in the airfoil. In addition, the size and/or configuration of passages 34 may also vary depending on the configurations of baffle 32 and/or opening 26. In addition, although elliptical openings or cavities 26 are illustrated in combination with elliptically shaped inserts, it is also contemplated that other configurations may be employed (e.g., non-elliptical openings) with an elliptically shaped insert 32. Still further, an elliptically shaped opening or cavity 26 may be employed with a non-elliptically shaped insert 32.

Although, FIGS. 3 and 4 describe an airfoil 28 of a vane 24 it is understood that various embodiments of the present disclosure may be used in other applications or components of the engine 10 such as airfoils of a rotating blade, or an airfoil of a ground based turbine engine, or any component having an internal cavity wherein it is desirable to employ the baffle inserts 32 of the present disclosure in order to increase the heat transfer coefficient of the cooling air passing through the internal cavity in order to enhance convective cooling within the component and lower the operating temperatures of the component.

In accordance with various embodiments of the present disclosure, the exterior surface 38 of the baffle insert 32 may have a variety of configurations that can be combined with the interior surface 36 of the openings or cavities 26 of the airfoil 28. In various embodiments, the exterior surface 38 may be configured to have a plurality of protrusions or trip strips 40 that protrude or extend from the exterior surface 38 of the baffle insert 32 in order to make the convective airflow more turbulent and thus increase the heat transfer of the cooling air passing through the cavities or openings 26. This improved heat transfer is provided without increasing a stress concentration on the interior surface 36 of the airfoil. The plurality of protrusions or trip strips 40 may be arranged in anyone one of a corkscrew configuration, an offset corkscrew configuration, a chevron configuration, an offset chevron configuration, a spiral corkscrew configuration, a multi-length corkscrew configuration, a crosshatch configuration, and equivalents thereof. It is, of course, understood that the aforementioned configurations are merely provided as non-limiting alternatives and various embodiments of the present disclosure are considered to encompass numerous configurations which may or may not include the aforementioned configurations.

In addition, the exterior surface 38 of the baffle inserts 32 may also be configured to include a rib or ribs 42, which, in combination with the trip strips 40, increase the heat transfer of the cooling air passing through the cavities or openings 26 by for example, creating vortices in the air flow through the cavities or openings 26. Still further, the aforementioned trip strips 40 and/or ribs 42 may be used in combination with a smooth interior surface of 36 of the openings or cavities 26 of the airfoil 28 or alternatively, the interior surface 36 may be configured to have protrusions or ribs that are complimentary to the trip strips 40 and/or ribs 42 in order to increase the heat transfer achieved by the cooling air passing through passages 34.

Figures 5A, 5B, 6A, 6B, 7A, 7B, 8A, 8B, 9A, 9B, 10A, 10B, 11:
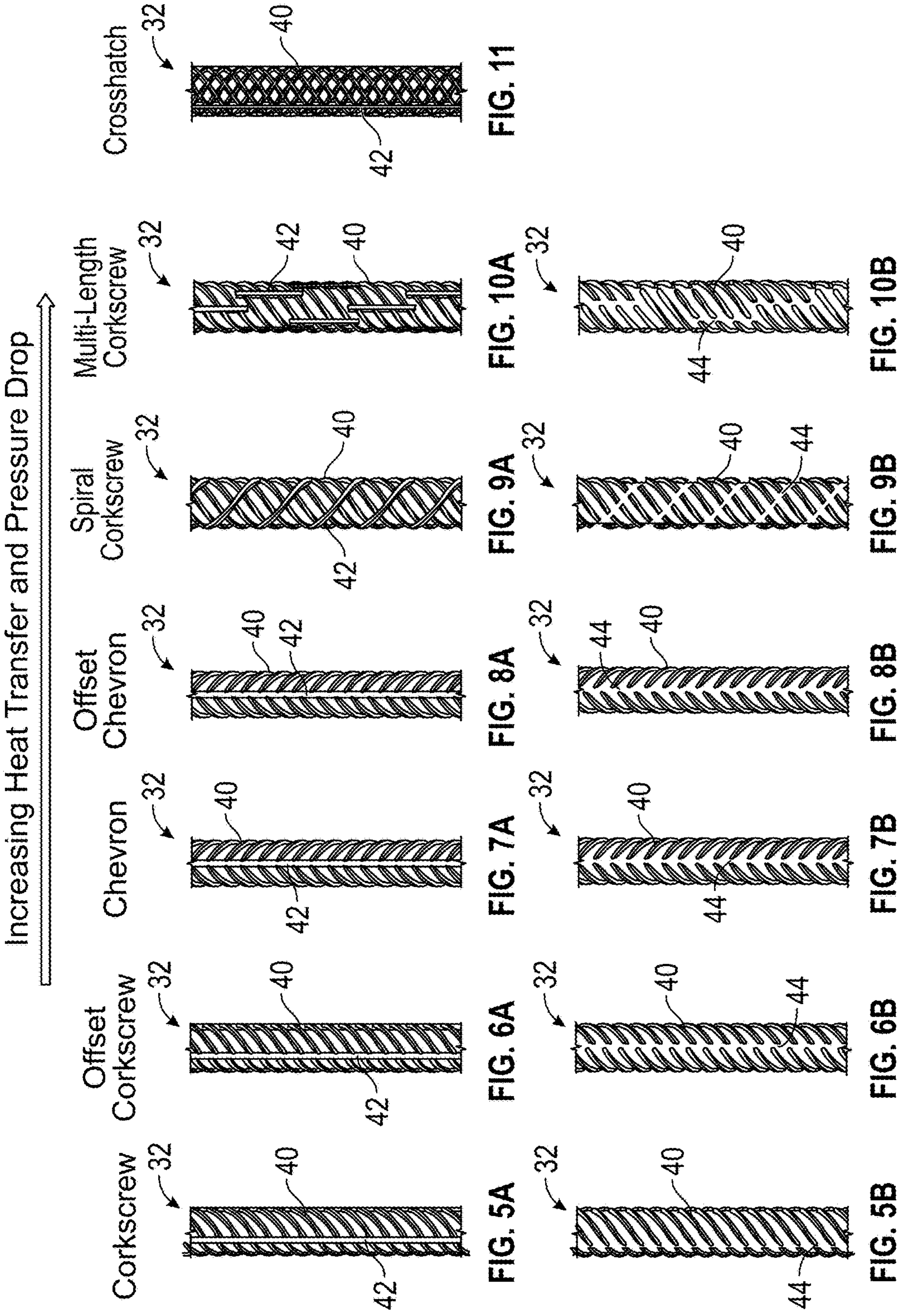

In FIGS. 5A-13B, various non-limiting configurations of the baffle inserts 32 are illustrated. In FIG. 5A, the trip strips 40 are arranged in a corkscrew configuration in combination with a vertical rib or ribs 42. As used herein, vertical rib or ribs may be referred to as extending between platform 29 and 31. In FIG. 5B, the trip strips 40 are arranged in a corkscrew configuration and there are no vertical ribs 42 thus leaving a gap 44 between the trip strips 40.

In FIG. 6A, the trip strips 40 are arranged in an offset corkscrew configuration in combination with a vertical rib or ribs 42. In FIG. 6B, the trip strips 40 are arranged in an offset corkscrew configuration and there are no vertical ribs 42 thus leaving a gap 44 between the trip strips 40.

In FIG. 7A, the trip strips 40 are arranged in a chevron configuration in combination with a vertical rib or ribs 42. In FIG. 7B, the trip strips 40 are arranged in a chevron configuration and there are no vertical ribs 42 thus leaving a gap 44 between the trip strips 40.

In FIG. 8A, the trip strips 40 are arranged in an offset chevron configuration in combination with a vertical rib or ribs 42. In FIG. 8B, the trip strips 40 are arranged in an offset chevron configuration and there are no vertical ribs 42 thus leaving a gap 44 between the trip strips 40.

In FIG. 9A, the trip strips 40 are arranged in a spiral corkscrew configuration in combination with a spiral rib or ribs 42. In FIG. 9B, the trip strips 40 are arranged in a spiral corkscrew configuration and there are no vertical ribs 42, thus leaving a gap 44 between the trip strips 40.

In FIG. 10A, the trip strips 40 are arranged in a multi-length corkscrew configuration in combination with a plurality of vertical rib or ribs 42. In FIG. 10B, the trip strips 40 are arranged in a multi-length corkscrew configuration and there are no vertical ribs 42 thus leaving a gap 44 between the trip strips 40.

In FIG. 11, the trip strips 40 are arranged in a crosshatch configuration in combination with a vertical rib or ribs 42.

Figure 12A:
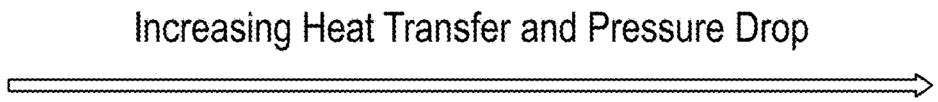
Figure 12A:
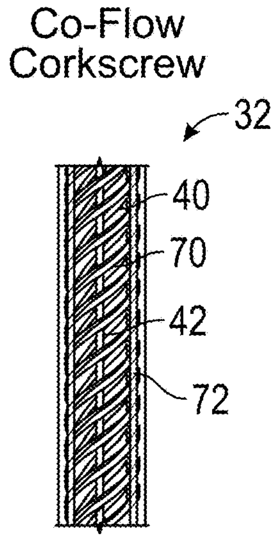

In FIGS. 5A-11, the interior surface 36 of the openings or cavities 26 of the airfoil 28 is smooth while in FIGS. 12A-13B, the interior surface 36 of the openings or cavities 26 of the airfoil 28 is configured to have trip strips and/or ribs. In FIGS. 12A and 12B, the trip strips 40 are arranged in a corkscrew configuration in combination with a vertical rib or ribs 42. In addition, the interior surface 36 of the openings or cavities 26 of the airfoil 28 is configured to have trip strips 40 and/or a vertical rib or ribs 42. In this embodiment, the trip strips 40 on the baffle and the interior surface 36 of the opening 26 are arranged to be co-flowing.

Figure 13A:
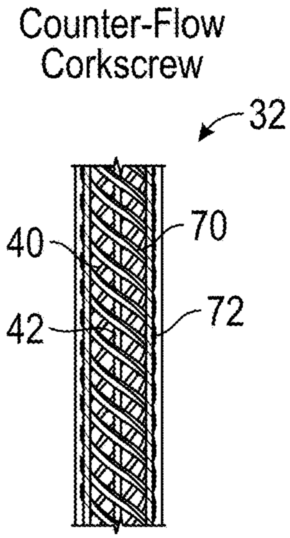
Figure 12B:
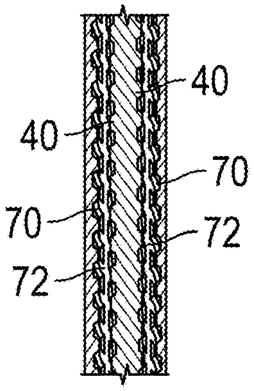
FIG. 12B is a cross-sectional view of the baffle insert illustrated in FIG. 12A.
Figure 13B:
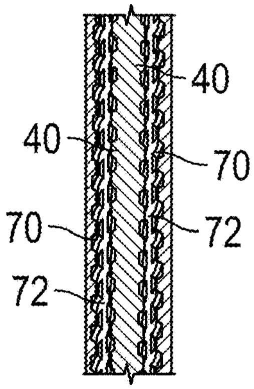
FIG. 13B is a cross-sectional view of the baffle insert illustrated in FIG. 13A.

In FIGS. 13A and 13B, the trip strips 40 on the baffle 32 and the interior surface 36 of the opening 26 are arranged in a corkscrew configuration in combination with a vertical rib or ribs. However, in this embodiment, trip strips are arranged to be counter-flowing.

In some embodiments, the trip strips 40 and/or the ribs and/or the gaps 44 extend completely around the entire perimeter of the baffle insert 32. Accordingly, the trip strips 40, ribs 42, and gaps 44 may be located proximate to either or both the pressure side and the suction side of the airfoil 28 as well as proximate the airfoil rib separating two internal cavities 26.

Referring generally to the arrangements of FIGS. 5A-13B, the corresponding baffle configurations illustrated, when viewed from left to right, provide an increasing heat transfer, which is desirable, and in some instances an increase in pressure drop, which may not be as desirable.

Figure 14:
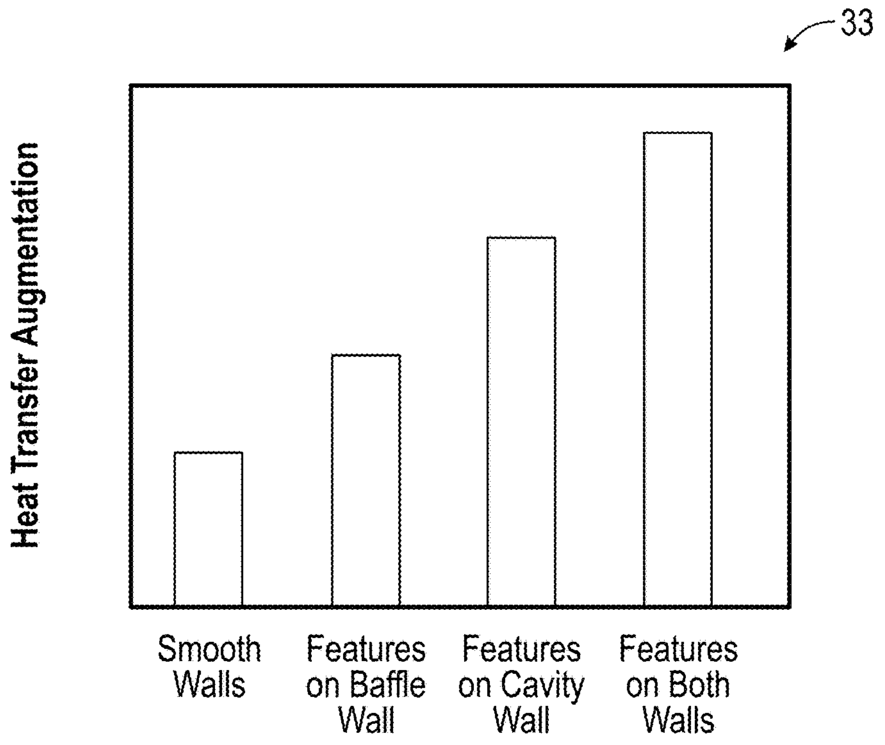
FIG. 14 is graph illustrating a plot of heat transfer augmentation vs various baffle and airfoil configurations.
Figure 15:
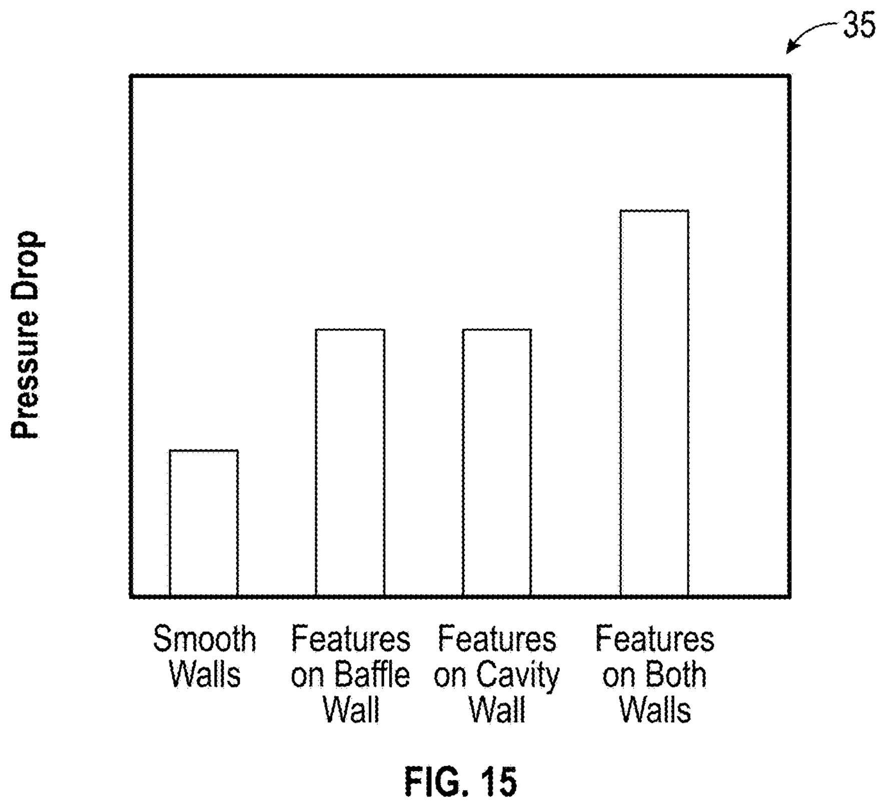
FIG. 15 is graph illustrating a plot of a pressure drop in an airfoil cavity vs various baffle and airfoil configurations.
Figure 16:
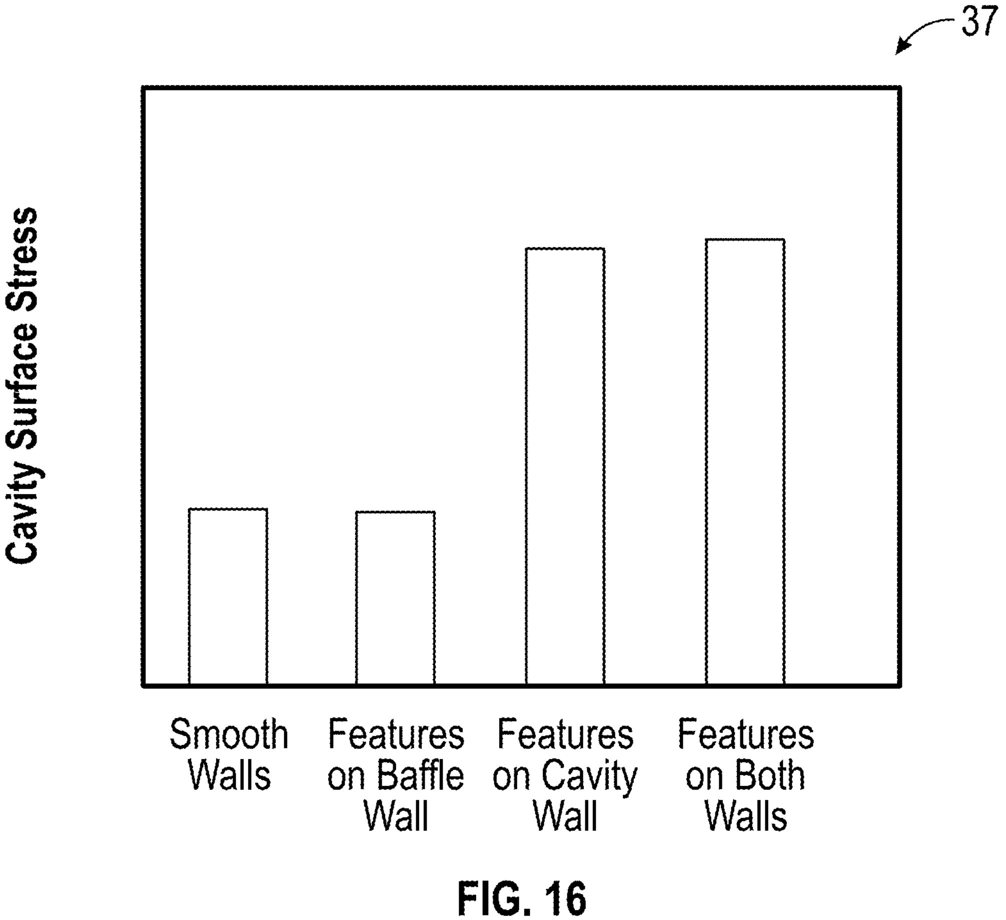
FIG. 16 is graph illustrating a plot of an airfoil cavity surface stress vs various baffle and airfoil configurations.

FIG. 14 is a graph 33 illustrating a plot of heat transfer augmentation vs various baffle and airfoil configurations. FIG. 15 is a graph 35 illustrating a plot of a pressure drop in an airfoil cavity vs various baffle and airfoil configurations and FIG. 16 is a graph 37 illustrating a plot of an airfoil cavity surface stress vs various baffle and airfoil configurations.

Figure 17:
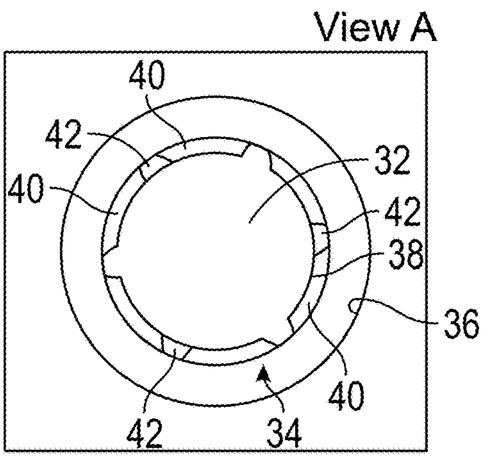
FIG. 17 is an enlarged cross-sectional view of a portion of the airfoil of FIG. 4 with a baffle insert according to an embodiment of the disclosure.
Figure 18:
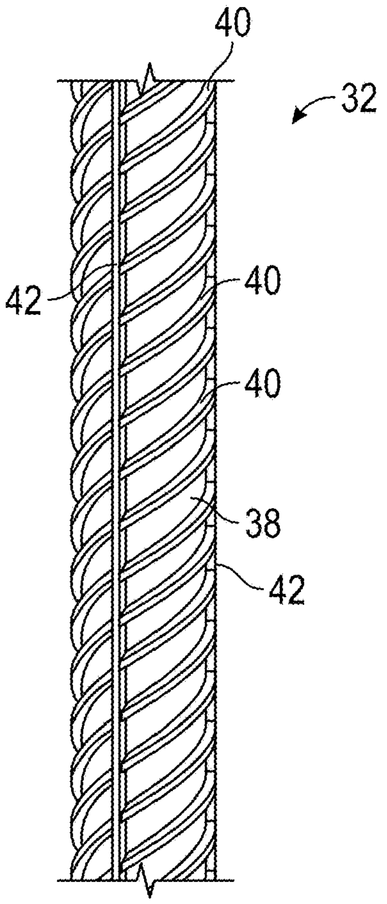
FIG. 18 is a view illustrating the baffle insert of FIG. 17.
Figure 19:
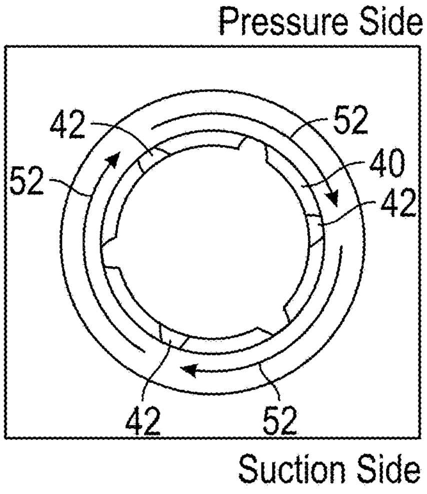
FIGS. 19 and 20 are views illustrating cooling airflows for the embodiments of FIGS. 17 and 18.
Figure 20:
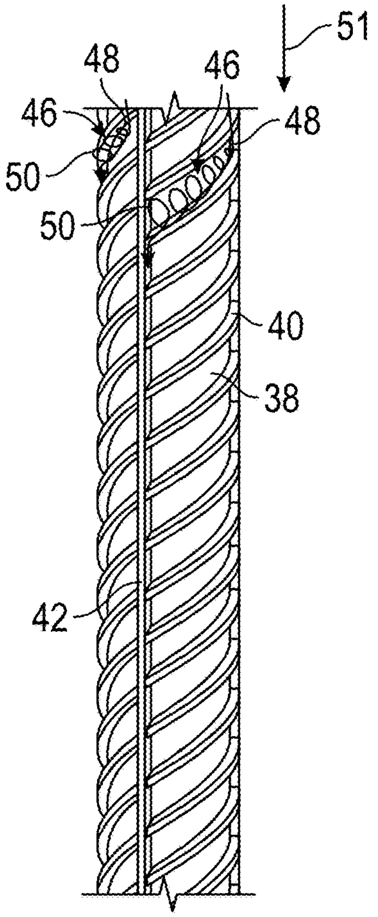

In FIG. 17, the view "A" from FIG. 4 is illustrated with a baffle 32 configured to have the trip strips 40 arranged in a corkscrew configuration in combination with a vertical rib or ribs 42. FIG. 18 illustrates the baffle 32 with such a configuration. In FIGS. 19 and 20, similar views to FIGS. 17 and 18 are provided. However, airflow vortices 46 of the cooling airflow created by the augmentors or trip strips 40 and/or ribs 42 are illustrated. In FIG. 20, the highest heat transfer of a cooling fluid occurs at the beginning of the trip strip 40 due to the smaller vortices 48 formed at the upstream end of the trip strip 40 as opposed to the larger vortices 50 formed at the downstream end of the trip strip 40. As used herein, the upstream end of the trip strip 40 is defined as the rib 42 to trip strip 40 interface closer to the fluid inlet while the downstream end of the trip strip 40 is defined as the rib 42 to trip strip 40 interface farther away from the fluid inlet, which in FIG. 20 may be referred to as the locations of smaller vortices 48 and larger vortices 50 respectively.

The vertical rib 42 causes the trip vortices 46 moving downwardly in the direction of arrow 51 to terminate and then the smaller vortices 48 begin again on the opposite side of the rib 42 after the cooling flow has travelled in the direction of arrow 51 and crossed the transition defined by rib 42. Because the large vortices 50 from one set of trip strips 40 are next to the small vortices 48 of an adjacent set of trip strips 40, the heat transfer winds up being averaged around the circumference of the cavity 26. Arrows 52 illustrate the cooling air flow swirls that are travelling between the baffle 32 and the interior surface 36 of the cavity or opening 26. In one embodiment, these cooling air flow swirls may be referred to as a swirling flow of cooling fluid passing between the interior surface of the cavity and the exterior surface of the baffle insert. This swirling flow may create a swirling flow field that provides increased heat transfer as compared to the purely radial flow about the baffle insert. It being understood that the features on the baffle insert and/or the interior surface of the cavity will create the aforementioned flow in the cooling fluid passing between the interior surface of the cavity and the exterior surface of the baffle insert. In addition, this swirling flow or swirling flow field may comprise a plurality of vortices 46 that are distributed between the interior surface of the cavity and the exterior surface of the baffle insert.

Figure 21:
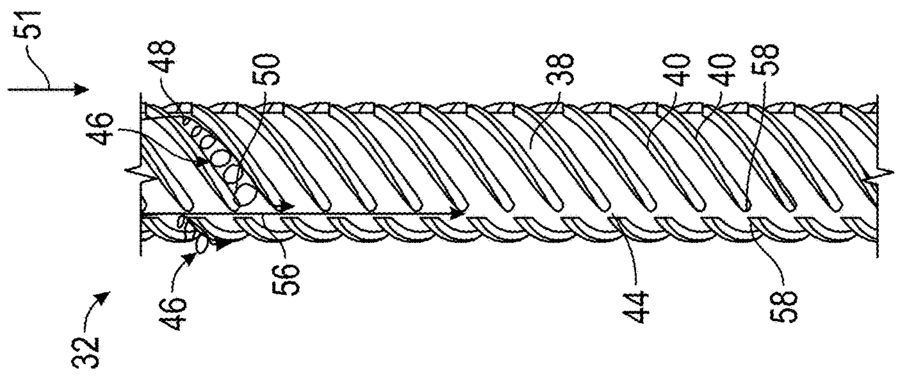

In FIG. 21, an alternative embodiment is illustrated. Here, the vertical rib(s) 42 are removed and a gap 44 is now present between the ends 58 of the respective trip strips that are arranged in a corkscrew configuration on the surface 38 of the baffle 32. Here, the cooling air will also travel in the gap 44 illustrated by arrow 56. In this embodiment, the cooling flow in the direction of arrow 56 will act like a rib and similarly cause the trip vortices to terminate at the interface of the vortices with the cooling flow in the direction of arrow 56.

Figure 23:
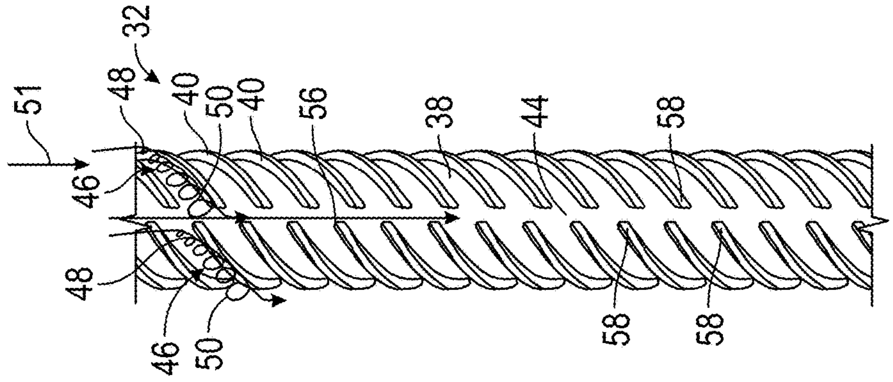
FIGS. 21-23 are views illustrating alternative baffle insert configurations.
Figure 22:
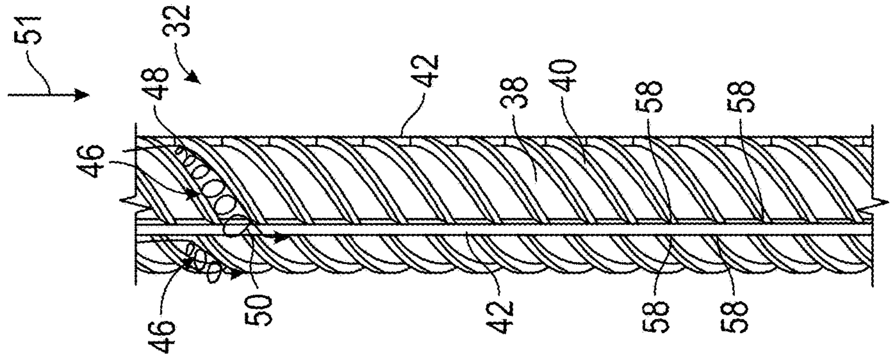

In FIG. 22, yet another alternative embodiment is illustrated. In this embodiment, the trip strips 40 are again arranged in a corkscrew configuration. However, ends 58 of the trip strips 40 are radially offset from each other. By offsetting the ends 58 of the trip strips 40, the termination and restarting of the vortices at the interface with vertical rib 42 is further enhanced. In FIG. 23, an alternative embodiment is illustrated. Here, the vertical rib(s) 42 of the embodiment of FIG. 22 are removed and a gap 54 is now present between the ends 58 of the respective trip strips 40 that are arranged in an offset corkscrew configuration on the surface 38 of the baffle 32. Here, the cooling air will also travel in the gap 54 illustrated by arrow 56. In this embodiment, the cooling flow in the direction of arrow 56 will act like a rib and similarly cause the trip vortices to terminate at the interface of the vortices with the cooling flow in the direction of arrow. Similar to the previous embodiments, the highest heat transfer occurs at the beginning of the trip 40 due to the smaller vortices 48 formed at the upstream end of the trip strip 40 as opposed to the larger vortices 50 formed at the downstream end of the trip strip 40.

Figure 24:
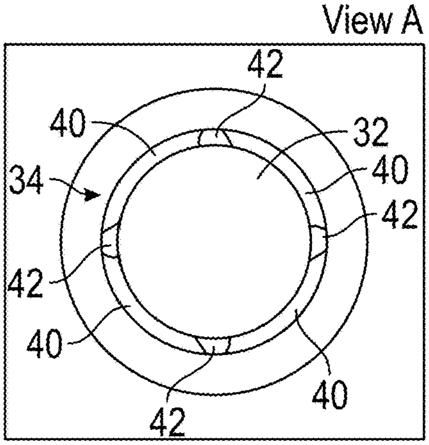
FIG. 24 is an enlarged cross-sectional view of a portion of the airfoil of FIG. 4 with a baffle insert according to another embodiment of the disclosure.
Figure 25:
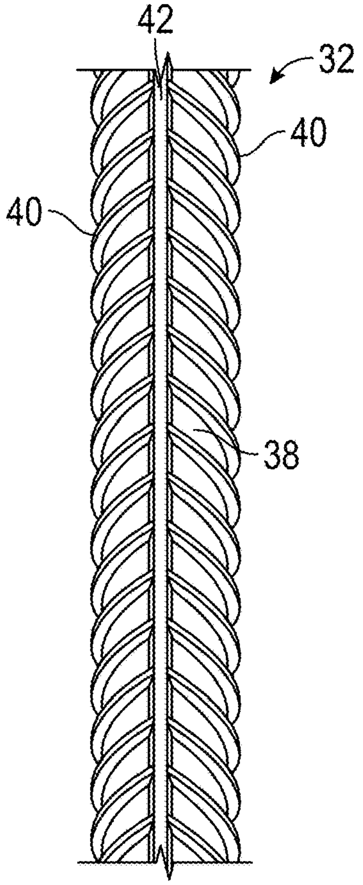
FIG. 25 is a view illustrating the baffle insert of FIG. 24.
Figure 26:
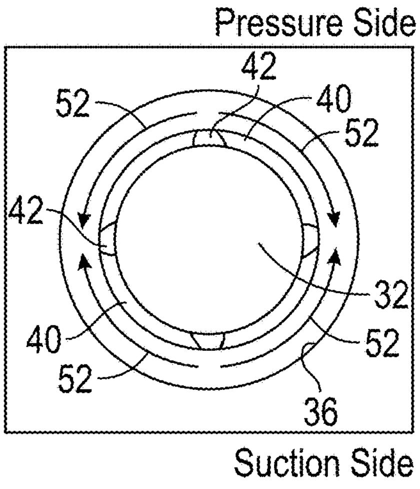
FIGS. 26 and 27 are views illustrating cooling airflows for the embodiments of FIGS. 24 and 25.
Figure 27:
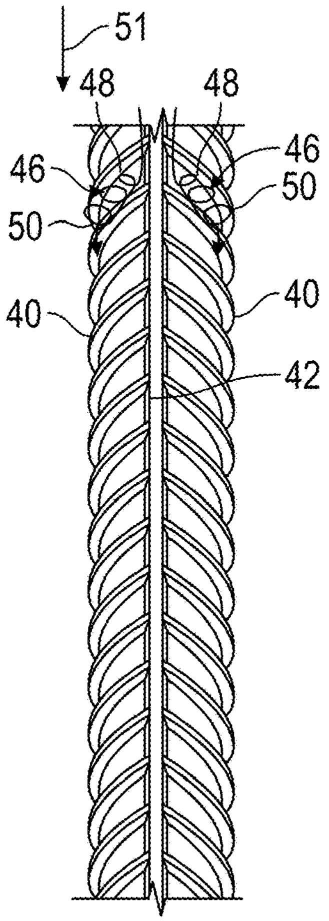

Referring now to FIGS. 24 and 25, yet another alternative embodiment is illustrated. In FIG. 24 the view "A" from FIG. 4 is illustrated with a baffle 32. Here baffle 32 is configured to have the trip strips 40 arranged in a chevron configuration in combination with a vertical rib or ribs 42. FIG. 25 illustrates the baffle 32 with such a configuration. In FIGS. 26 and 27 similar views to FIGS. 24 and 25 are provided. However, airflow vortices 46 of the cooling airflow created by the augmentors or trip strips 40 and/or ribs 42 are illustrated. In FIG. 27, the highest heat transfer of a cooling fluid occurs at the beginning of the trip strip 40 due to the smaller vortices 48 formed at the upstream end of the trip strip 40 as opposed to the larger vortices 50 formed at the downstream end of trip strip 40. As used herein, upstream end of the trip strip 40 is defined as the rib 42 to trip strip 40 interface closer to the fluid inlet while the downstream end of the trip strip 40 is defined as the rib 42 to trip strip 40 interface farther away from the fluid inlet, which in FIG. 27 may be referred to as the locations of smaller vortices 48 and larger vortices 50 respectively. Since the upstream ends of one set of trip strips 40 is next to the upstream ends of an adjacent set of trip strips 40 and the downstream ends of one set of trip strips 40 is next to the downstream ends of an adjacent set of trip strips 40, the chevron configuration results in a region of high heat transfer, such as the pressure or suction sides of cavity 26, and a region of low heat transfer, such as the walls between adjacent cavities 26.

The vertical rib 42 causes the trip vortices 46 moving downwardly in the direction of arrow 51 to terminate and then the smaller vortices 48 begin again on the opposite side of the rib 42 after the cooling flow has travelled in the direction of arrow 51 and crossed the transition defined by rib 42. Arrows 52 illustrate the cooling air flow swirls that are travelling between the baffle 32 and the interior surface 36 of the cavity or opening 26.

Figure 28:
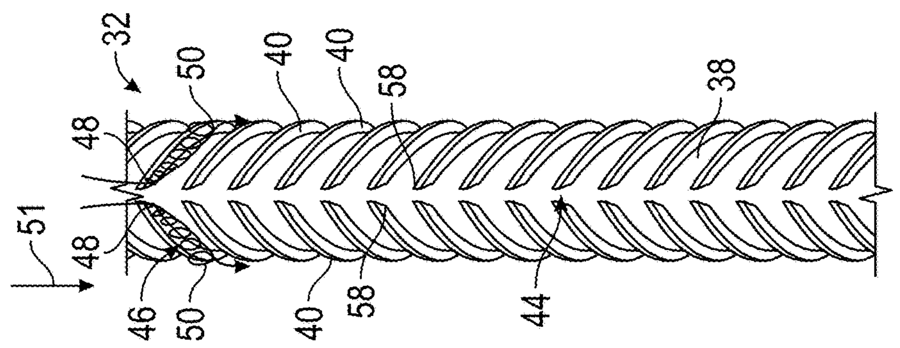

In FIGS. 28-31, still other alternative embodiments are illustrated. In FIG. 28, the vertical rib(s) 42 are removed and a gap 54 is now present between the ends of the respective trip strips that are arranged in a chevron configuration on the surface 38 of the baffle 32. Again, the highest heat transfer will occur at the beginning of the trip strip 40 travelling downward in the direction of arrow 51 due to the smaller vortices 48 formed at the upstream end of the trip strip 40 as opposed to the larger vortices 50 formed at the downstream end of the trip strip 40.

Figure 29:
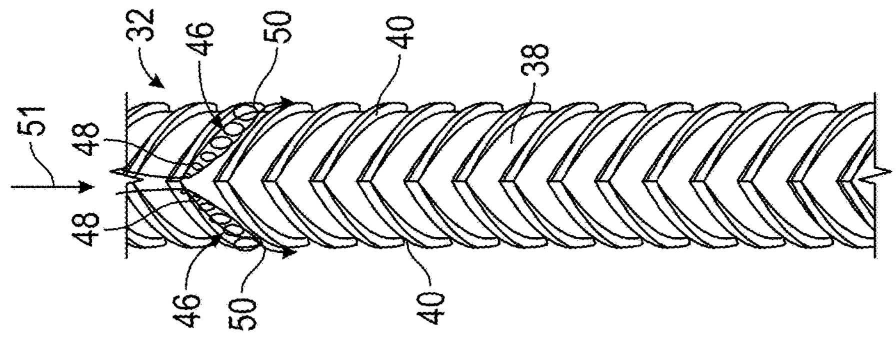

In FIG. 29, the vertical rib(s) 42 are removed and the trip strips 40 are arranged in a chevron configuration on the surface 38 of the baffle 32 without any gap. Again, the highest heat transfer will occur at the beginning of the trip strip 40 travelling downward in the direction of arrow 51 due to the smaller vortices 48 formed at the upstream end of the trip strip 40 as opposed to the larger vortices 50 formed at the downstream end of the trip strip 40.

Figure 30:
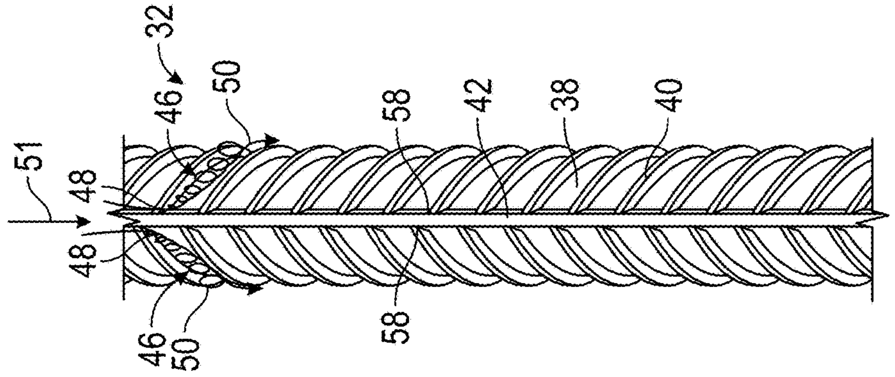

In FIG. 30, the trip strips 40 are arranged in a chevron configuration on the surface 38 of the baffle 32. However, the ends 58 of the trip strips 40 are radially offset from each other and a vertical rib 42 is located between the ends 58 of the trip strips 40. Again, the highest heat transfer will occur at the beginning of the trip strip 40 travelling downward in the direction of arrow 51 due to the smaller vortices 48 formed at the upstream end of the trip strip 40 as opposed to the larger vortices 50 formed at the downstream end of the trip strip 40.

Figure 31:
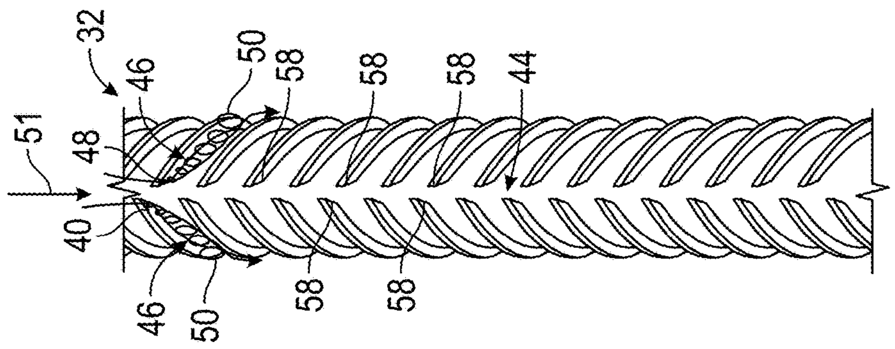
FIGS. 28-31 are views illustrating still other alternative baffle insert configurations.

In FIG. 31, the trip strips 40 are arranged in a chevron configuration on the surface 38 of the baffle 32. However, the ends 58 of the trip strips 40 are radially offset from each other and the vertical rib 42 is removed so that a gap 54 is located between the ends 58 of the trip strips 40. Again, the highest heat transfer will occur at the beginning of the trip strip 40 travelling downward in the direction of arrow 51 due to the smaller vortices 48 formed at the upstream end of the trip strip 40 as opposed to the larger vortices 50 formed at the end of the trip strip 40.

Figure 32:
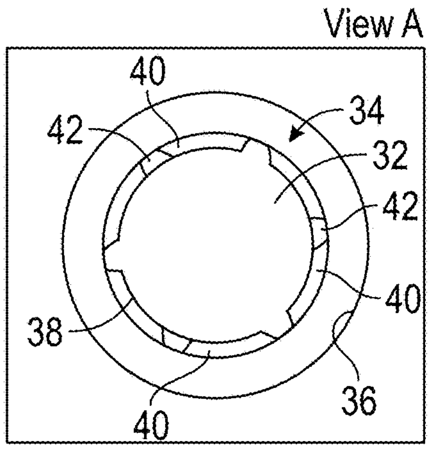
FIG. 32 is an enlarged cross-sectional view of a portion of the airfoil of FIG. 4 with a baffle insert according to yet another embodiment of the disclosure.
Figure 33:
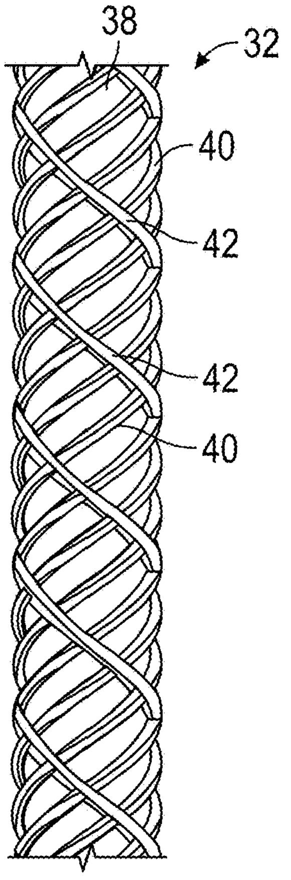
FIG. 33 is a view illustrating the baffle insert of FIG. 32.

Referring now to FIGS. 32 and 33, yet another alternative embodiment is illustrated. In FIG. 32 the view "A" from FIG. 4 is illustrated with a baffle 32. In this embodiment, baffle 32 is configured to have the trip strips 40 arranged in a spiral corkscrew configuration in combination with a spiral rib or ribs 42. FIG. 33 illustrates the baffle 32 with such a configuration.

Figure 34:
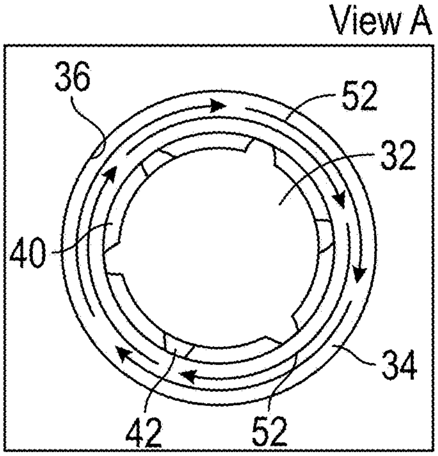
FIGS. 34 and 35 are views illustrating cooling airflows for the embodiments of FIGS. 35 and 32.
Figure 35:
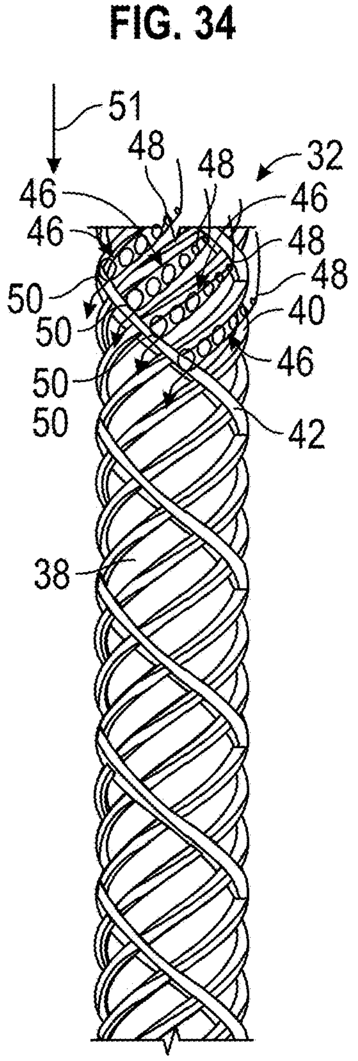

In FIGS. 34 and 35, similar views to FIGS. 32 and 33 are provided. However, airflow vortices 46 of the cooling airflow created by the augmentors or trip strips 40 and/or ribs 42 are illustrated. Here, the highest heat transfer of a cooling fluid occurs where the vortices are the smallest, which is at the beginning of the trip strip 40. As used herein, the beginning of the trip strip 40, also known as the upstream end of the trip strip 40, is defined as the rib 42 to trip strip 40 interface closer to the fluid inlet while the downstream end of the trip strip 40 is defined as the rib 42 to trip strip 40 interface farther away from the fluid inlet, which in FIG. 35 may be referred to as the locations of smaller vortices 48 and larger vortices 50 respectively. Also, shown in FIG. 34 is that the heat transfer beginning at the trip strip rib interface is distributed circumferentially about the passage 34 due to the spiral configuration of rib 42. See arrows 52 of FIG. 34, which illustrate the distributed cooling flow or air flow swirls. In one embodiment, these cooling air flow swirls may be referred to as a swirling flow of cooling fluid passing between the interior surface of the cavity and the exterior surface of the baffle insert. This swirling flow may create a swirling flow field that provides increased heat transfer as compared to the purely radial flow about the baffle insert. It being understood that the features on the baffle insert and/or the interior surface of the cavity will create the aforementioned flow in the cooling fluid passing between the interior surface of the cavity and the exterior surface of the baffle insert. In addition, this swirling flow or swirling flow field may comprise a plurality of vortices 46 that are distributed between the interior surface of the cavity and the exterior surface of the baffle insert.

Figure 36B:
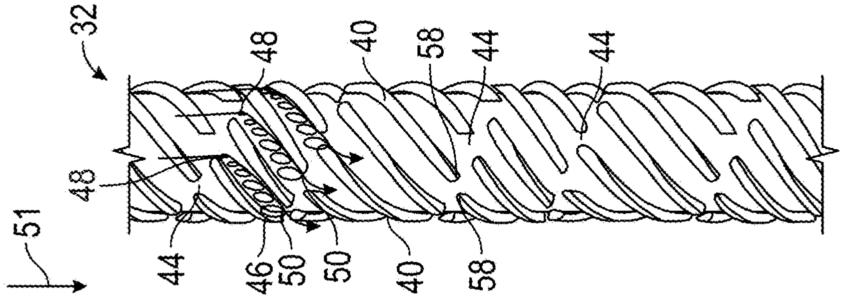
Figure 36A:
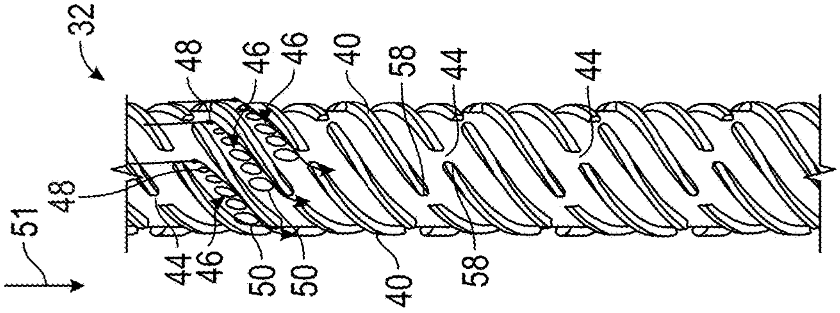

In FIGS. 36A-39, still other alternative embodiments of the spiral configuration are illustrated. In FIG. 36A, the rib(s) 42 are removed and a gap 44 is now present between the ends 58 of the respective trip strips that are arranged in a spiral configuration on the surface 38 of the baffle 32. In this embodiment, the lengths of the trip strips 40 are generally the same or equal. Again, the highest heat transfer will occur at the beginning of the trip strip 40 travelling downward in the direction of arrow 51 due to the smaller vortices 48 formed at the upstream end of the trip strip 40 as opposed to the larger vortices 50 formed at the downstream end of the trip strip 40. In FIG. 36B, the rib(s) 42 are removed and a gap 44 is now present between the ends 58 of the respective trip strips 40 that are arranged in a spiral configuration on the surface 38 of the baffle 32. However, in this embodiment, the ends 58 are radially offset from each other. Also, the lengths of the trip strips 40 may vary in length with respect to each other or be generally the same or equal. Again, the highest heat transfer will occur at the beginning of the trip strip 40 travelling downward in the direction of arrow 51 due to the smaller vortices 48 formed at the upstream end of the trip strip 40 as opposed to the larger vortices 50 formed at the downstream end of the trip strip 40

Figure 37:
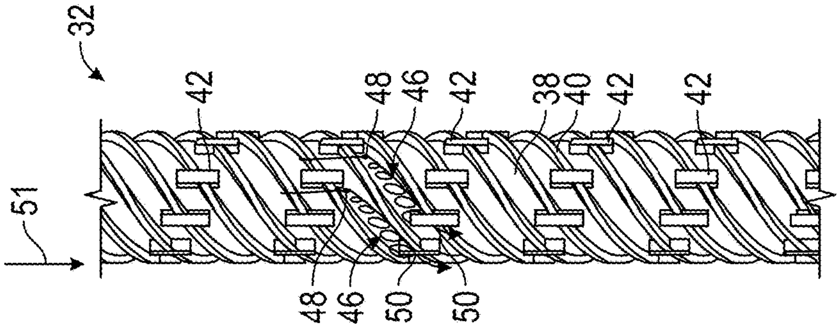
FIGS. 36A-39 are views illustrating still other alternative baffle insert configurations.
Figure 38:
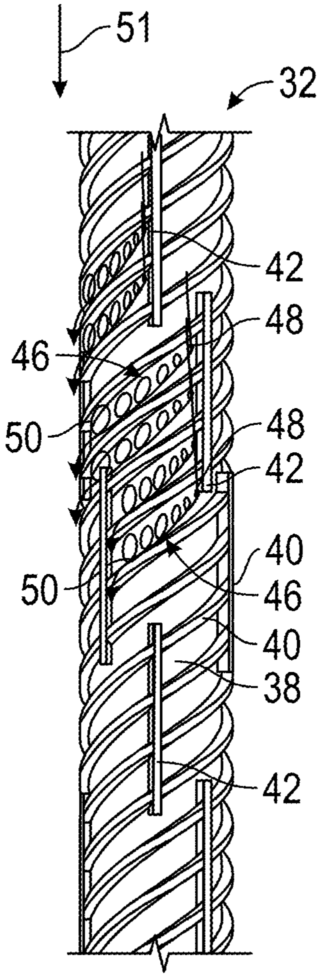

In FIG. 37, the spiral rib(s) 42 are removed and replaced with a plurality of vertical ribs 42 arranged with the spiral configuration of the trip strips 40. In this embodiment, the trip strips all still have the same length. In FIG. 38, the length of the vertical ribs 42 is increased to cover multiple trip strips 40, which results in some of the trip strips having longer lengths than others. Again, the highest heat transfer will occur at the beginning of the trip strip 40 travelling downward in the direction of arrow 51 due to the smaller vortices 48 formed at the upstream end of the trip strip 40 as opposed to the larger vortices 50 formed at the downstream end of the trip strip 40. The shorter trip strips 40 will have higher heat transfer coefficients due to the smaller vortices.

Figure 39:
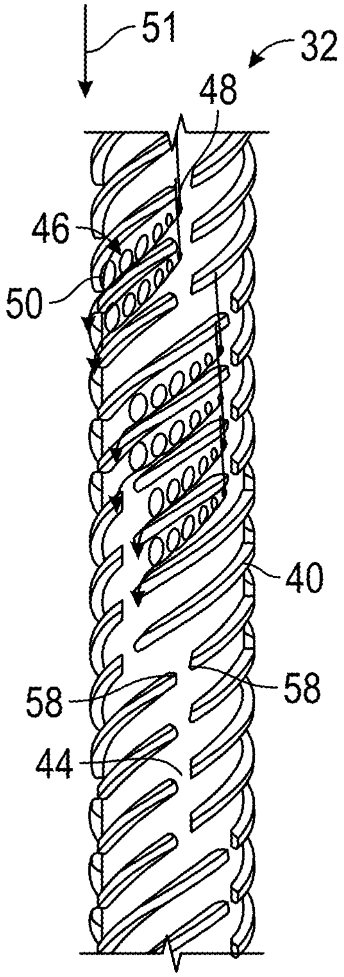

In FIG. 39, the rib(s) 42 are removed and the spiral trip strips 40 have varying lengths. Again, the highest heat transfer will occur at the beginning of the trip strip 40 travelling downward in the direction of arrow 51 due to the smaller vortices 48 formed at the upstream end of the trip strip 40 as opposed to the larger vortices 50 formed at the downstream end of the trip strip 40. The shorter trip strips 40 will have higher heat transfer coefficients due to the smaller vortices.

The embodiments of FIGS. 36-39 also cause the cooling flow to be distributed about the passage 34 due to the spiral configuration of the trip strips and/or associated ribs 42.

Figure 40:
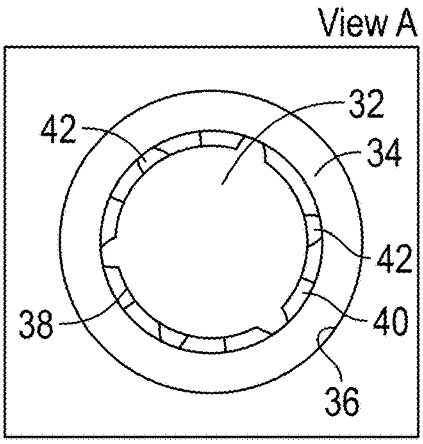
FIG. 40 is an enlarged cross-sectional view of a portion of the airfoil of FIG. 4 with a baffle insert according to yet another embodiment of the disclosure.
Figure 41:
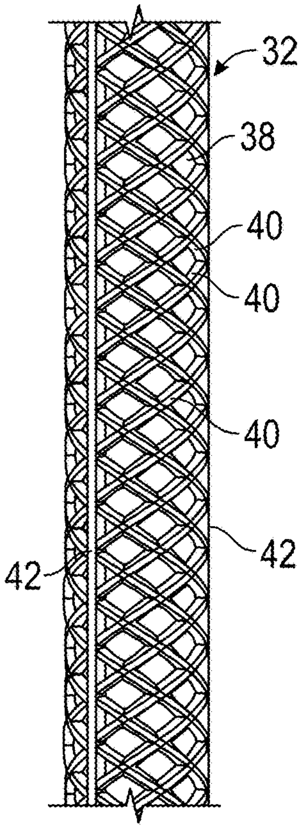
FIG. 41 is a view illustrating the baffle insert of FIG. 40.
Figure 42:
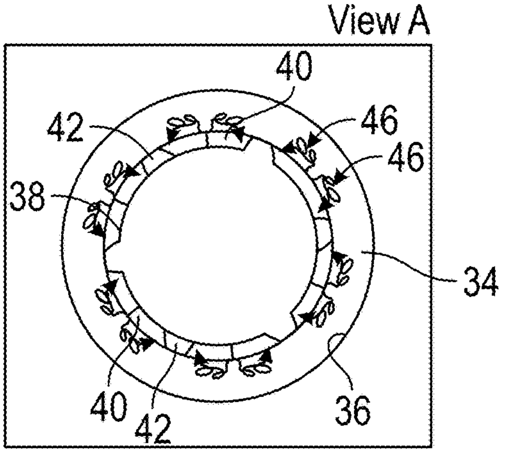
FIGS. 42 and 43 are views illustrating cooling airflows for the embodiments of FIGS. 40 and 41.
Figure 43:
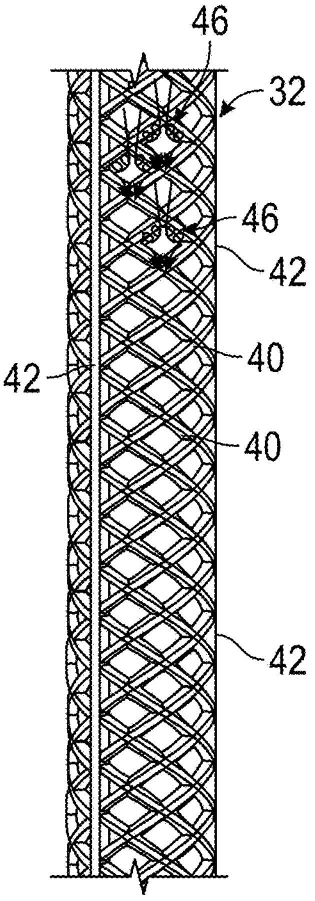

Referring now to FIGS. 40 and 41, yet another alternative embodiment is illustrated. In FIG. 40, the view "A" from FIG. 4 is illustrated. In this embodiment, the baffle 32 is configured to have the trip strips 40 arranged in a cross-hatched configuration in combination with a vertical rib or ribs 42. FIG. 41 illustrates the baffle 32 with such a configuration. In FIGS. 42 and 43, similar views to FIGS. 40 and 41 are provided. However, airflow vortices 46 of the cooling airflow created by the augmentors or trip strips 40 and/or ribs 42 are illustrated. Here, the combination of the rib 42 and the crosshatched configuration of the trip strips 40 causes the cooling air flow to remain substantially radial and the vortices to remain small. This results in high heat transfer coefficients at the expense of high pressure drop.

Figure 46:
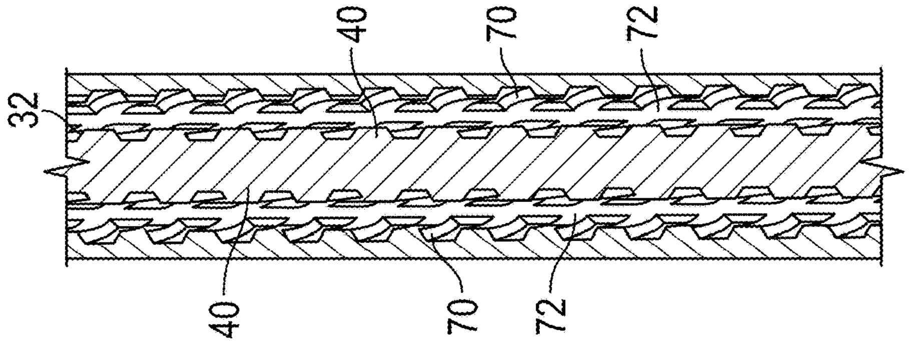
FIG. 46 is a cross-sectional view along lines 46-46 of FIG. 44.
Figure 45:
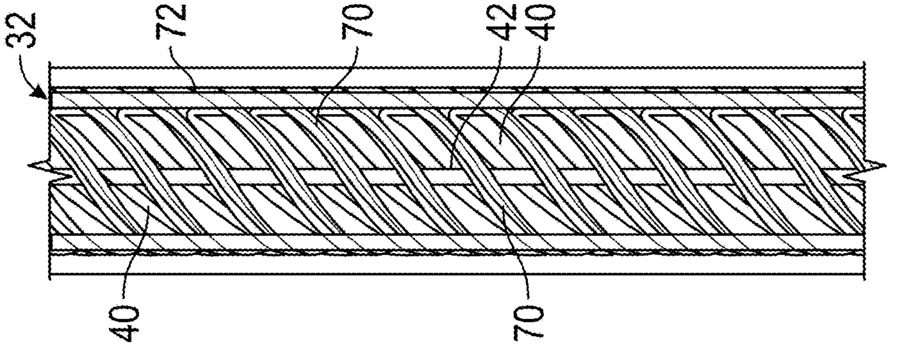
FIG. 45 is a view illustrating the baffle insert of FIG. 44.
Figure 44:
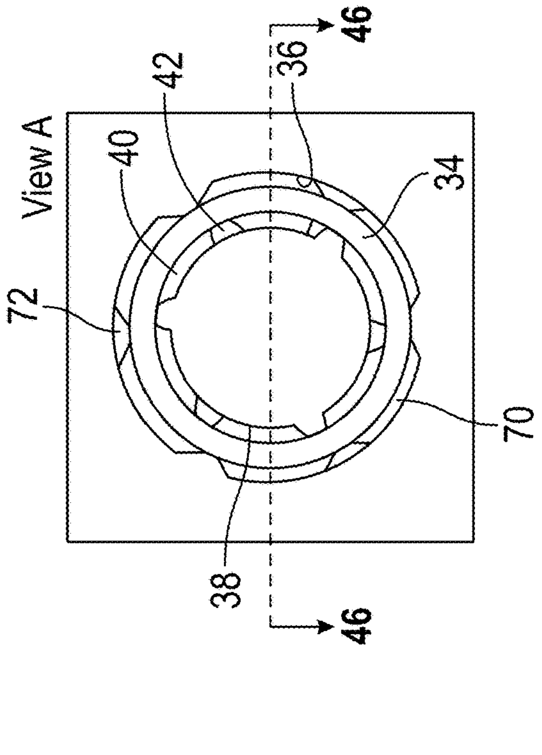
FIG. 44 is an enlarged cross-sectional view of a portion of the airfoil of FIG. 4 with a baffle insert according to yet another embodiment of the disclosure.

In FIGS. 44-46, yet another embodiment is illustrated. Here the baffle 32 is configured to have a similar configuration to that of FIG. 18 (corkscrew trip strips with a vertical rib or ribs). However, the interior surface 36 of the cavity or opening 26 is also configured to have trip strips 70 and vertical ribs 72. In this embodiment, the trip strips 70 are also arranged in a corkscrew pattern and the ribs 72 are vertically arranged. Moreover, the trip strips 40 and 70 are arranged to be co-flowing when the baffle 32 is inserted into cavity or opening 26. In FIG. 44, the view "A" from FIG. 4 is illustrated. As stated above, the baffle 32 is configured to have the trip strips 40 arranged in a corkscrew configuration in combination with a vertical rib or ribs 42 and the aforementioned trip strips 70 and vertical ribs 72 are located on the interior surface 36 of the cavity 26. FIG. 45 illustrates the baffle 32 with such a configuration. FIG. 46 is a cross-sectional view along lines 46-46 of FIG. 44.

Figure 47:
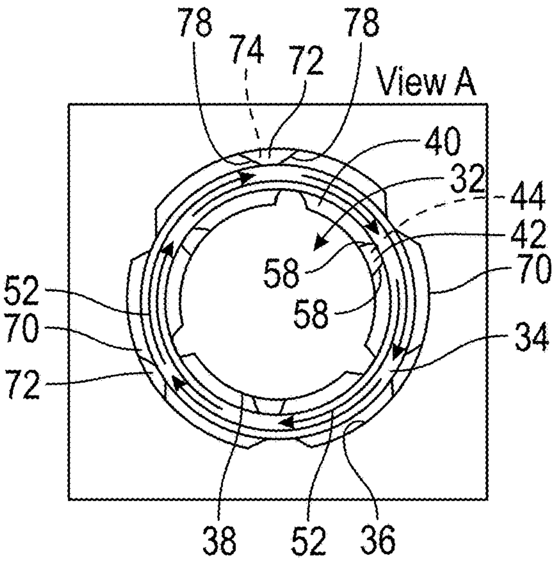
FIGS. 47 and 48 are views illustrating cooling airflows for the embodiments of FIGS. 44-45.
Figure 48:
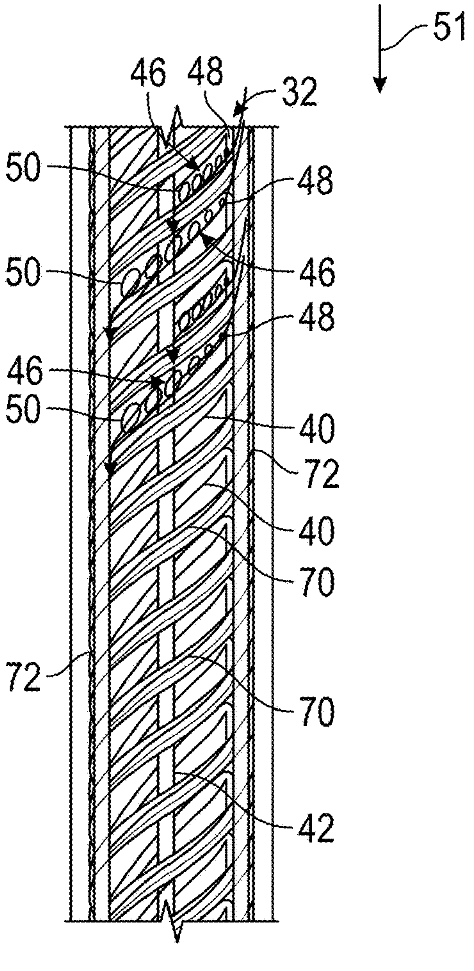

In FIGS. 47 and 48, similar views to FIGS. 44 and 45 are provided. However, airflow vortices 46 of the cooling airflow created by the augmentors or trip strips 40, 70 and/or ribs 42, 70 are illustrated. In FIG. 48, the highest heat transfer of a cooling fluid occurs at the beginning of the trip strip 40 due to the smaller vortices 48 formed at the upstream end of the trip strip 40 as opposed to the larger vortices 50 formed at the downstream end of the trip strip 40. As used herein, the upstream end of the trip strip 40 is defined as the rib 42 to trip strip 40 interface closer to the fluid inlet while the downstream end of the trip strip 40 is defined as the rib 42 to trip strip 40 interface farther away from the fluid inlet, which in FIG. 48 may be referred to as the locations of smaller vortices 48 and larger vortices 50 respectively. FIG. 47 illustrates the co-flowing cooling air flow in the direction of arrows 52. As seen in FIGS. 14-16, putting trip strips on both the baffle surface 38 and the airfoil surface 36 can result in higher heat transfer, but also higher pressure drop and airfoil stress.

In addition, and referring to the embodiments of at least FIGS. 44-48, the plurality of trip strips 40 of the baffle insert 32 and the plurality of trips strips 70 of the interior surface 36 of the internal cooling cavity 26 may be arranged in anyone of the aforementioned configurations, including but not limited to: a corkscrew configuration; an offset corkscrew configuration; a chevron configuration; an offset chevron configuration; a spiral corkscrew configuration; an offset spiral corkscrew configuration; and a multi-length corkscrew configuration.

Figure 51:
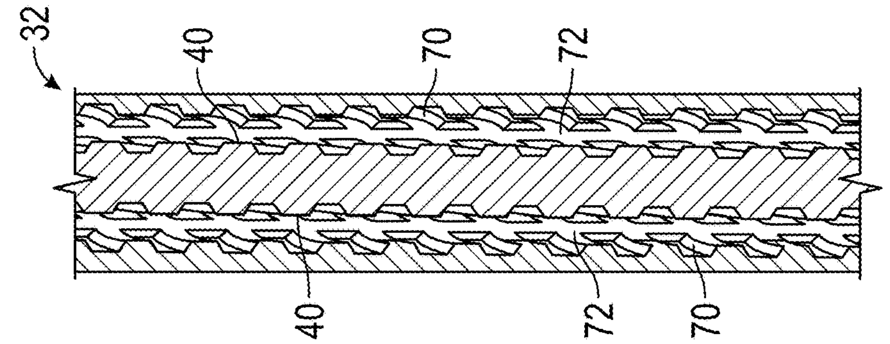
FIG. 51 is a cross-sectional view along lines 51-51 of FIG. 49.
Figure 50:
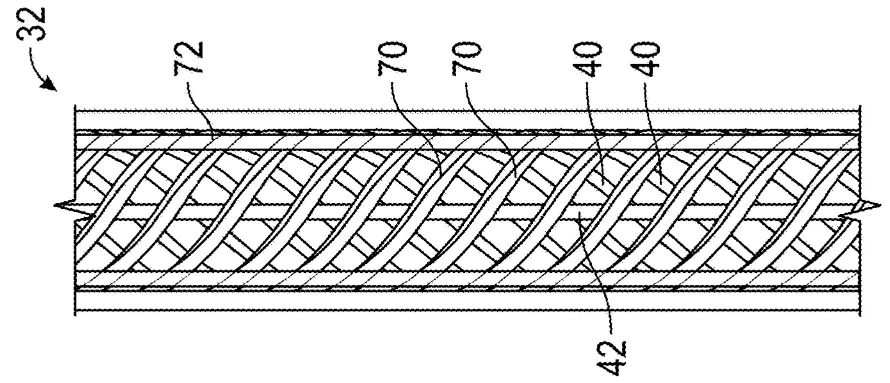
FIG. 50 is a view illustrating the baffle insert of FIG. 49.
Figure 49:
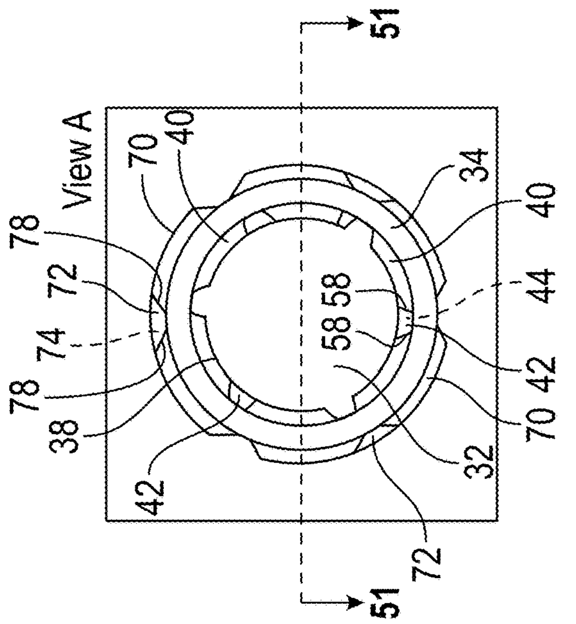
FIG. 49 is an enlarged cross-sectional view of a portion of the airfoil of FIG. 4 with a baffle insert according to yet another embodiment of the disclosure.

In FIGS. 49-51, yet another embodiment is illustrated. Here the baffle 32 is configured to have a similar configuration to that of FIG. 18 (corkscrew trip strips with a vertical rib or ribs). However, the interior surface 36 of the cavity or opening 26 is also configured to have trip strips 70 and vertical ribs 72. In this embodiment, the trip strips 70 are also arranged in a corkscrew pattern and the ribs 72 are vertically arranged. However, the trip strips 40 and 70 are arranged to be counter-flowing when the baffle 32 is inserted into cavity or opening 26. In FIG. 49, the view "A" from FIG. 4 is illustrated with such a baffle 32. As mentioned above, the baffle 32 is configured to have the trip strips 40 arranged in a corkscrew configuration in combination with a vertical rib or ribs 42 and the aforementioned trip strips 70 and vertical rib 72 are located on the interior surface 36 of the cavity 26. FIG. 50 illustrates the baffle 32 with such a configuration. FIG. 51 is a cross-sectional view along lines 51-51 of FIG. 49.

Figure 52:
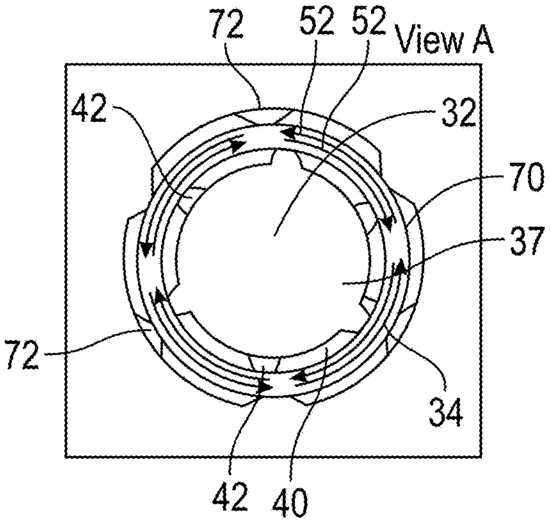
FIGS. 52 and 53 are views illustrating cooling airflows for the embodiments of FIGS. 49 and 50.
Figure 53:
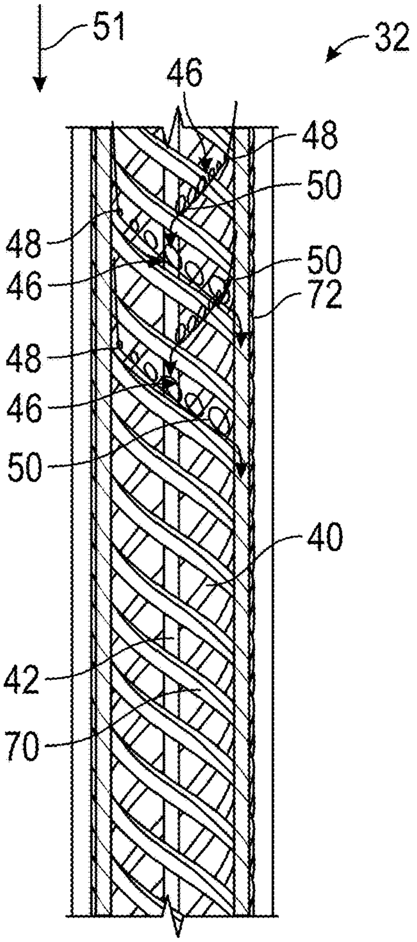

In FIGS. 52 and 53, similar views to FIGS. 49 and 50 are provided. However, airflow vortices 46 of the cooling airflow created by the augmentors or trip strips 40, 70 and/or ribs 42, 72 are illustrated. In FIG. 53, the highest heat transfer of a cooling fluid occurs at the beginning of the trip strip 40 due to the smaller vortices 48 formed at the upstream end of the trip strip 40 as opposed to the larger vortices 50 formed at the downstream end of the trip strip 40. As used herein, the upstream end of the trip strip 40 is defined as the rib 42 to trip strip 40 interface closer to the fluid inlet while the downstream end of the trip strip 40 is defined as the rib 42 to trip strip 40 interface farther away from the fluid inlet, which in FIG. 53 may be referred to as the locations of smaller vortices 48 and larger vortices 50 respectively. FIG. 52 illustrates the counter flowing cooling air flow in the direction of arrows 52. By incorporating a counter flowing cooling pattern, higher heat transfer coefficients can be achieved over a co-flowing cooling pattern, but at the expense of higher pressure drop.

In addition, and referring to the embodiments of at least FIGS. 49-53, the plurality of trip strips 40 of the baffle insert 32 and the plurality of trips strips 70 of the interior surface 36 of the internal cooling cavity 26 may be arranged in anyone of the aforementioned configurations, including but not limited to: a corkscrew configuration; an offset corkscrew configuration; a chevron configuration; an offset chevron configuration; a spiral corkscrew configuration; an offset spiral corkscrew configuration; and a multi-length corkscrew configuration.

In yet another alternative embodiment, and referring to FIGS. 44-53 and similar to the previous embodiments, the ribs 42, 72 may be removed and a gap 44, 74 (illustrated by the dashed lines in FIGS. 47 and 49) may be located between the ends 58, 78 of the trip strips 40, 70 respectively. In these embodiments or in the previous embodiments, the ribs 42, 72 and/or gaps 44, 74 can also be collectively be referred to as a separating feature(s) that is/are located between the ends 58, 78 of the trip strips 40 and 70.

In addition, and referring to the embodiments of at least FIGS. 44-53, the plurality of trip strips 40 of the baffle insert 32 and/or the plurality of trips strips 70 of the interior surface 36 of the internal cooling cavity 26 may be arranged in a crosshatch configuration.

Also illustrated in at least FIGS. 47, 49, and 52 is that the surface 38, trip strip 40, ribs 42, and/or gaps 44 are in a facing spaced relationship with respect to surface 36, trip strips 70, ribs 72, and/or gaps 74 such that cooling air may flow therebetween.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A component of a gas turbine engine, the component comprising:

an internal cooling cavity extending through an interior of the component;

a baffle insert configured to be inserted into the internal cooling cavity;

a plurality of trip strips extending upwardly from an exterior surface of the baffle insert in a spiral configuration and configured to create a plurality of vortices at the exterior surface of the baffle insert;

at least one separating feature located between a pair of ends of a pair of the plurality of trip strips located on the exterior surface of the baffle insert, wherein the plurality of trip strips located on the exterior surface of the baffle insert and the at least one separating feature of the baffle insert are spaced from an interior surface of the internal cooling cavity;

a plurality of trip strips extending upwardly from the interior surface of the internal cooling cavity in a spiral configuration and configured to create a plurality of vortices at the interior surface of the internal cooling cavity; and at least one separating feature located between a pair of ends of the plurality of trip strips located on the interior surface of the internal cooling cavity, wherein the plurality of trip strips located on the interior surface of the internal cooling cavity and the at least one separating feature of the interior surface of the cooling cavity are spaced from the exterior surface of the baffle insert.

2. The component as in claim 1, wherein the plurality of trip strips of the baffle insert are arranged in a co-flowing configuration with respect to the plurality of trip strips of the interior surface of the internal cooling cavity.

3. The component as in claim 1, wherein the at least one separating feature located on at least one of the baffle insert and the interior surface of the internal cooling cavity is a rib.

4. The component as in claim 3, wherein the rib is a plurality of ribs.

5. The component as in claim 3, wherein the rib is orientated in one of the following configurations: vertically arranged with respect to a length of the baffle insert; and spirally arranged with respect to a length of the baffle insert.

6. The component as in claim 1, wherein the internal cooling cavity is elliptical in shape.

7. The component as in claim 6, wherein the exterior surface of the baffle insert is elliptical in shape.

8. The component as in claim 7, wherein the at least one separating feature located on at least one of the baffle insert and the interior surface of the internal cooling cavity is a plurality of separating features.

9. The component as in claim 8, wherein the plurality of trip strips of the baffle insert are arranged in a co-flowing configuration with respect to the plurality of trip strips of the interior surface of the internal cooling cavity.

10. The component as in claim 8, wherein the plurality of trip strips of the baffle insert are arranged in a counter-flowing configuration with respect to the plurality of trip strips of the interior surface of the internal cooling cavity.

11. The component as in claim 7, wherein the at least one separating feature located on at least one of the baffle insert and the interior surface of the internal cooling cavity is a rib.

12. The component as in claim 11, wherein the rib is a plurality of ribs and the plurality of ribs have varying lengths.

13. The component as in claim 7, wherein the at least one separating feature located on at least one of the baffle insert and the interior surface of the internal cooling cavity is a plurality of gaps and the plurality of gaps are arranged in at least one of the following configurations: vertically arranged with respect to the length of the baffle insert; and spirally arranged with respect to the length of the baffle insert.

14. The component as in claim 6, wherein the at least one separating feature located on at least one of the baffle insert and the interior surface of the internal cooling cavity is a plurality of gaps and the plurality of gaps are arranged in at least one of the following configurations: vertically arranged with respect to the length of the baffle insert; and spirally arranged with respect to the length of the baffle insert.

15. The component as in claim 1, wherein the exterior surface of the baffle insert is elliptical in shape and wherein the at least one separating feature located on at least one of the baffle insert and the interior surface of the internal cooling cavity is a plurality of gaps and the plurality of gaps are arranged in at least one of the following configurations: vertically arranged with respect to the length of the baffle insert; and spirally arranged with respect to the length of the baffle insert.

16. The component as in claim 1, wherein the plurality of trip strips have varying lengths on at least one of the baffle insert and the interior surface of the internal cooling cavity.

17. The component as in claim 1, wherein the plurality of trip strips are arranged around the entire perimeter of at least one of the baffle insert and the interior surface of the internal cooling cavity.

18. The component as in claim 1, wherein the component is one of: a vane; a blade; a blade outer air seal; and a combustor panel.

19. A component of a gas turbine engine, the component comprising:

an internal cooling cavity extending through an interior of the component;

a baffle insert configured to be inserted into the internal cooling cavity;

a plurality of trip strips extending upwardly from an exterior surface of the baffle insert;

at least one separating feature located between a pair of ends of a pair of the plurality of trip strips located on the exterior surface of the baffle insert, wherein the plurality of trip strips located on the exterior surface of the baffle insert and the at least one separating feature of the baffle insert are spaced from an interior surface of the internal cooling cavity;

a plurality of trip strips extending upwardly from the interior surface of the internal cooling cavity; and at least one separating feature located between a pair of ends of the plurality of trip strips located on the interior surface of the internal cooling cavity, wherein the plurality of trip strips located on the interior surface of the internal cooling cavity and the at least one separating feature of the interior surface of the cooling cavity are spaced from the exterior surface of the baffle insert, wherein the plurality of trip strips located on the exterior surface of the baffle insert and the plurality of trip strips located on the interior surface of the internal cooling cavity are arranged in at least one of the following configurations: a corkscrew configuration; an offset corkscrew configuration; a chevron configuration; an offset chevron configuration; a spiral corkscrew configuration; an offset spiral corkscrew configuration; a multi-length corkscrew configuration; and a cross-hatch configuration.

20. A component of a gas turbine engine, the component comprising:

an internal cooling cavity extending through an interior of the component;

a baffle insert configured to be inserted into the internal cooling cavity;

a plurality of trip strips extending upwardly from an exterior surface of the baffle insert;

at least one separating feature located between a pair of ends of a pair of the plurality of trip strips located on the exterior surface of the baffle insert, wherein the plurality of trip strips located on the exterior surface of the baffle insert and the at least one separating feature of the baffle insert are spaced from an interior surface of the internal cooling cavity;

a plurality of trip strips extending upwardly from the interior surface of the internal cooling cavity; and at least one separating feature located between a pair of ends of the plurality of trip strips located on the interior surface of the internal cooling cavity, wherein the plurality of trip strips located on the interior surface of the internal cooling cavity and the at least one separating feature of the interior surface of the cooling cavity are spaced from the exterior surface of the baffle insert, wherein the plurality of trip strips located on the exterior surface of the baffle insert are arranged in a counter-flowing configuration with respect to the plurality of trip strips of the interior surface of the internal cooling cavity.

* * * * *